United States Patent
Comiskey et al.

(10) Patent No.: US 6,724,519 B1
(45) Date of Patent: Apr. 20, 2004

(54) PROTECTIVE ELECTRODES FOR ELECTROPHORETIC DISPLAYS

(75) Inventors: Barrett Comiskey, Cambridge, MA (US); Ian Morrison, Acton, MA (US); Paul Drzaic, Lexington, MA (US); Peter T. Kazlas, Brookline, MA (US); Russell Wilcox, Natick, MA (US); Robert Feeney, Scituate, MA (US)

(73) Assignee: E-Ink Corporation, Cambridge, MA (US)

( * ) Notice: Subject to any disclaimer, the term of this patent is extended or adjusted under 35 U.S.C. 154(b) by 0 days.

(21) Appl. No.: 09/467,324

(22) Filed: Dec. 20, 1999

Related U.S. Application Data

(60) Provisional application No. 60/115,052, filed on Jan. 8, 1999, provisional application No. 60/113,418, filed on Dec. 22, 1998, and provisional application No. 60/113,078, filed on Dec. 21, 1998.

(51) Int. Cl.[7] .................................................. G02B 26/00
(52) U.S. Cl. ........................................... 359/296; 345/109
(58) Field of Search ........................ 359/296; 345/109; 430/32, 35, 36

(56) References Cited

U.S. PATENT DOCUMENTS

| | | | |
|---|---|---|---|
| 3,806,893 A | 4/1974 | Ohnishi et al. | 340/173 |
| 3,850,627 A | 11/1974 | Wells et al. | 96/1.3 |
| 3,892,568 A | 7/1975 | Ota | 96/1.3 |
| 4,041,481 A | 8/1977 | Sato | 340/324 |
| 4,045,327 A | 8/1977 | Noma et al. | 204/299 |

(List continued on next page.)

FOREIGN PATENT DOCUMENTS

| | | | |
|---|---|---|---|
| DE | 4431441 C1 | 1/1996 | H02J/13/00 |
| DE | 19500694 A1 | 8/1996 | G09F/9/33 |
| EP | 0186710 A1 | 7/1986 | G02F/1/133 |
| EP | 0361420 A2 | 4/1990 | G02F/1/133 |
| EP | 0404545 A2 | 12/1990 | G02F/1/136 |

(List continued on next page.)

OTHER PUBLICATIONS

W.S. Quon, "Multilevel Voltage Select (MLVS): A Novel Technique to X–Y Address an Electrophoretic Image Display" *Trans. On Electron Devices* ED24(8):1121–1123 (1977).

A.L. Dalisa, "Electrophoretic Display Technology" *Trans. On Electron Devices* ED24(7):827–834 (1977).

B. Singer et al., "An X–Y Addressable Electrophoretic Display" *Proc. Of the SID* 18(3&4):255–266 (1977).

S.F. Blazo, "10.1/9:00A.M.: High Resolution Electrophoretic Display with Photoconductor Addressing" *SID 82 Digest*, pp 92–93 (1982).

N.K. Sheridon et al., "10.2/9:25 A.M.: A Photoconductor–Addressed Electrophoretic Cell for Office Data Display" *SID 82 Digest*, pp 94–95 (1982).

(List continued on next page.)

*Primary Examiner*—Scott J. Sugarman
*Assistant Examiner*—Richard Hanig
(74) *Attorney, Agent, or Firm*—Testa, Hurwitz & Thibeault, LLP

(57) ABSTRACT

An electrophoretic display having a protective electrode that reduces the degradation of the display caused by mechanical or electrochemical action. The electrode can include a protective layer that reduces the mechanical or electrochemical damage to a transparent conductive electrode. The protective electrode can be a vapor permeable electrode that is a reticulated electrically conductive structure, such as a metal screen or wire mesh, or a reticulated structure coated or impregnated with a conductive material. The protective electrode can include a layer that protects the display media from physical abrasion or removal by mechanical action, while allowing the application of an electric field to cause the display to be addressed.

22 Claims, 11 Drawing Sheets

U.S. PATENT DOCUMENTS

| | | | |
|---|---|---|---|
| 4,068,927 A | 1/1978 | White | 350/160 |
| 4,071,430 A | 1/1978 | Liebert | 204/299 |
| 4,088,395 A | 5/1978 | Gigila | 350/357 |
| 4,123,346 A | 10/1978 | Ploix | 204/299 |
| 4,126,854 A | 11/1978 | Sheridon | 340/373 |
| 4,149,149 A | 4/1979 | Miki et al. | 340/753 |
| 4,203,106 A * | 5/1980 | Dalisa et al. | 345/107 |
| 4,218,302 A * | 8/1980 | Dalisa et al. | 359/296 |
| 4,305,807 A | 12/1981 | Somlyody | 204/299 |
| 4,418,346 A | 11/1983 | Batchelder | 340/787 |
| 4,430,648 A | 2/1984 | Togashi et al. | 340/718 |
| 4,450,440 A | 5/1984 | White | 340/753 |
| 4,522,472 A | 6/1985 | Liebert et al. | 350/362 |
| 4,648,956 A | 3/1987 | Marshall et al. | 204/299 |
| 4,684,219 A * | 8/1987 | Cox et al. | 349/154 |
| 4,741,604 A | 5/1988 | Kornfeld | 350/362 |
| 4,902,108 A * | 2/1990 | Byker | 359/265 |
| 4,931,019 A | 6/1990 | Park | 434/409 |
| 5,105,185 A | 4/1992 | Nakanowatari et al. | 340/784 |
| 5,106,468 A * | 4/1992 | Chimenti | 204/564 |
| 5,223,823 A | 6/1993 | Disanto et al. | 340/787 |
| 5,250,932 A | 10/1993 | Yoshimoto et al. | 345/206 |
| 5,250,938 A | 10/1993 | DiSanto et al. | 345/107 |
| 5,254,981 A | 10/1993 | Disanto et al. | 345/107 |
| 5,293,528 A | 3/1994 | DiSanto et al. | 345/107 |
| 5,302,235 A | 4/1994 | DiSanto et al. | 156/643 |
| 5,304,439 A | 4/1994 | Disanto et al. | 430/20 |
| 5,315,312 A | 5/1994 | DiSanto et al. | 345/107 |
| 5,345,251 A | 9/1994 | DiSanto et al. | 345/107 |
| 5,359,346 A | 10/1994 | DiSanto et al. | 345/107 |
| 5,402,145 A * | 3/1995 | Disanto et al. | 345/107 |
| 5,412,398 A | 5/1995 | DiSanto et al. | 345/107 |
| 5,460,688 A | 10/1995 | DiSanto et al. | 216/5 |
| 5,467,107 A | 11/1995 | DiSanto et al. | 345/107 |
| 5,499,038 A | 3/1996 | DiSanto et al. | 345/107 |
| 5,561,443 A | 10/1996 | Disanto et al. | 345/107 |
| 5,565,885 A | 10/1996 | Tamanoi | 345/100 |
| 5,575,554 A | 11/1996 | Guritz | 362/103 |
| 5,627,561 A | 5/1997 | Laspina et al. | 345/107 |
| 5,650,872 A * | 7/1997 | Saxe et al. | 359/296 |
| 5,684,501 A | 11/1997 | Knapp et al. | 345/94 |
| 5,689,282 A | 11/1997 | Wolfs et al. | 345/100 |
| 5,717,515 A | 2/1998 | Sheridon | 359/296 |
| 5,729,663 A | 3/1998 | Lin et al. | 395/109 |
| 5,739,801 A | 4/1998 | Sheridon | 345/84 |
| 5,786,875 A | 7/1998 | Brader et al. | 349/20 |
| 6,413,790 B1 * | 7/2002 | Duthaler et al. | 438/21 |

FOREIGN PATENT DOCUMENTS

| | | | |
|---|---|---|---|
| EP | 0443571 A2 | 8/1991 | G02F/1/1333 |
| EP | 0525852 A1 | 2/1993 | G09G/3/36 |
| EP | 0684579 A2 | 11/1995 | G06K/11/12 |
| GB | 2306229 A | 4/1997 | G02F/1/1335 |
| JP | 55096922 | 7/1980 | G02F/1/133 |
| JP | 62058222 | 3/1987 | G02F/1/133 |
| JP | 01086116 | 3/1989 | G02F/1/19 |
| JP | 6089081 | 3/1994 | G09G/3/36 |
| JP | 07036020 | 2/1995 | G02F/1/1333 |
| JP | 9031453 A | 2/1997 | B01J/13/16 |
| JP | 10149118 A | 6/1998 | G09F/9/37 |
| WO | WO92/17873 | 10/1992 | G09G/3/34 |
| WO | WO92/20060 | 11/1992 | G09G/3/34 |
| WO | WO92/21733 | 12/1992 | C09K/19/00 |
| WO | WO93/02443 | 2/1993 | G09G/3/34 |
| WO | WO93/04458 | 3/1993 | G09G/3/00 |
| WO | WO93/04459 | 3/1993 | G09G/3/34 |
| WO | WO93/05425 | 3/1993 | G02B/26/00 |
| WO | WO93/07608 | 4/1993 | G09G/3/34 |
| WO | WO93/17414 | 9/1993 | G09G/3/34 |
| WO | WO 94/11772 | 5/1994 | G02B/26/00 |
| WO | WO95/06307 | 3/1995 | G09G/3/00 |
| WO | WO95/07527 | 3/1995 | G09G/3/34 |
| WO | WO95/10107 | 4/1995 | G09G/3/34 |
| WO | WO97/35298 A3 | 9/1997 | G09G/3/36 |
| WO | WO97/35298 A2 | 9/1997 | G09G/3/36 |
| WO | WO98/19208 | 5/1998 | G02F/1/167 |
| WO | WO 99/59101 | 11/1999 | |

OTHER PUBLICATIONS

R.R. Shiffman et al., "An Electrophoretic Image Display with Internal NMOS Address Logic and Display Drivers" *Proc. of the SID* 25(2):105–115 (1984).

P. Murau, "9.4: Characteristics of an X–Y Addressed Electrophoretic Image Display (EPID)" *SID 84 Digest*, p 141 (1984).

S. Shiwa et al., "5.6: Electrophoretic Display Method Using Ionographic Technology" *SID 88 Digest*, pp 61–62 (1988).

N.A. Vaz et al., "Dual Frequency Addressing of Polymer–Dispersed Liquid–Crystal Films" *J. Appl. Phys.* 65(12):5043–5050 (1989).

M. Yamaguchi et al., "Equivalent Circuit of Ion Projection–Driven Electrophoretic Display" *IEICE Trans.* 74(12):4152–4156 (1991).

H. Hosaka et al., "Electromagnetic Microrelays: Concepts and Fundamental Characteristics" *Sensors and Actuators A* 40:41–47 (1994).

F.M. Moesner et al., "Devices for Particle Handling by an AC Electric Field" *1995 IEEE*, pp 66–71 (1995).

Anne Chiang, Don Curry and Mark Zarzycki, XP–002102514 "A Stylus Writable Electrophoretic Display Device," Xerox Research Center, Palo Alto, CA.

* cited by examiner

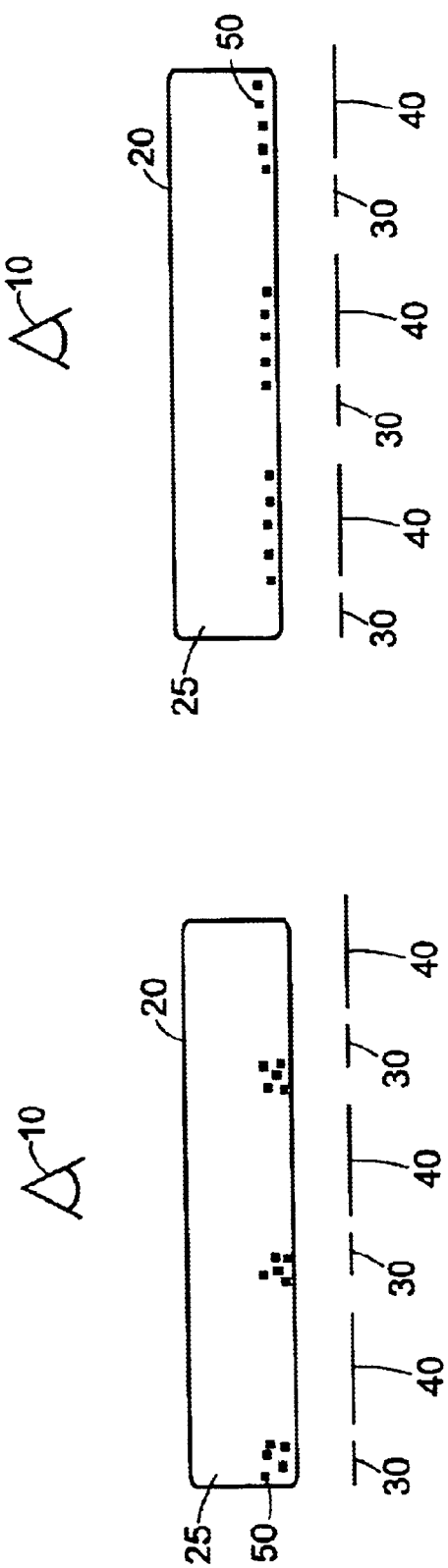

PROTECTIVE ELECTRODES FOR ELECTROPHORETIC DISPLAYS

CROSS-REFERENCE TO RELATED APPLICATIONS

This application claims priority to U.S. Provisional Application Ser. No. 60/113,078, filed Dec. 21, 1998, U.S. Provisional Application Ser. No. 60/113,418, filed Dec. 22, 1998, and U.S. Provisional Application Ser. No. 60/115,052, filed Jan. 8, 1999, the contents of all of which are hereby incorporated herein by reference.

FIELD OF THE INVENTION

The present invention relates to electronic displays and, in particular, to electrodes that protect displays from deterioration, their mode of use and their methods of fabrication.

BACKGROUND OF THE INVENTION

Electrophoretic displays have been the subject of intense research and development for a number of years. Electrophoretic displays have attributes of good brightness and contrast, wide viewing angles, state bistability, and low power consumption when compared with liquid crystal displays. Nevertheless, problems with the long-term image quality of these displays have prevented their widespread usage. For example, particles that make up such displays tend to cluster and settle, resulting in inadequate service-life for these displays.

An encapsulated, electrophoretic display typically does not suffer from the clustering and settling failure mode of traditional electrophoretic devices and provides further advantages, such as the ability to print or coat the display on a wide variety of flexible and rigid substrates.

Traditionally, electronic displays such as liquid crystal displays have been made by sandwiching an optoelectrically active material between two pieces of glass. In many cases each piece of glass has an etched, clear electrode structure formed using indium tin oxide ("ITO"). A first electrode structure controls all the segments of the display that may be addressed, that is, changed from one visual state to another. A second electrode, sometimes called a counter electrode, addresses all display segments as one large electrode, and is generally designed not to overlap any of the rear electrode wire connections that are not desired in the final image. Alternatively, the second electrode is also patterned to control specific segments of the displays. In these displays, unaddressed areas of the display have a defined appearance.

In electrophoretic displays, it has been commonly observed that the display fails after some time. One of the reasons why such a display may fail is that the materials is used to construct the display are damaged by repeated application of electrical addressing signals. Another reason why such displays fail is that the display elements or electrodes suffer mechanical or electrochemical damage.

SUMMARY OF THE INVENTION

In one aspect the invention provides novel apparatus and methods for providing protective electrodes for use in electrically addressable displays including electrophoretic displays. Additionally the invention discloses applications of these methods and materials in displays that can be flexible, that can be applied in large area, low cost, and high durability applications that operate under a variety of environments.

In one aspect, the present invention relates to a display that includes a display element capable of changing its appearance in response to an electric field, and a first electrode adjacent the display element, such that the first electrode provides a protective layer adapted to prevent mechanical or electrochemical damage to the display element In one embodiment, the display includes an electrophoretic display element that has as components a capsule, a dispersing fluid having a first optical property disposed within the capsule, and at least one electrophoretically-mobile particle disposed within the capsule. The at least one electrophoretically-mobile particle has a second optical property different from the first optical property, and the at least one electrophoretically-mobile particle can change position within the capsule under the influence of an applied electric field. The appearance of the display element can change depending on where the at least one electrophoretically-mobile particle is situated within the capsule.

In other embodiments, the protective layer is flexible, and the protective layer is adapted to prevent mechanical removal of the electrophoretic element from the display. In yet another embodiment, the protective layer includes a plurality of conductors extending therethrough. In still another embodiment, the first electrode is transparent and the protective layer is disposed upon the transparent electrode, the protective layer being capable of protecting the transparent electrode from degradation under the application of an electrical potential. In a further embodiment, the first electrode is transparent and comprises one or more oxides selected from the group consisting of indium oxide, tin oxide and indium tin oxide.

In another embodiment, the protective layer comprises at least one chemical composition selected from the group consisting of the metals nickel, palladium, platinum, ruthenium, rhodium, silver, aluminum, gold, titanium, chromium and zinc, and the oxides silver oxide (AgO), aluminum oxide ($Al_2O_3$), gold (III) oxide ($Au_2O_3$), titanium (II) oxide (TiO), titanium (IV) oxide ($TiO_2$), chromium (III) oxide ($Cr_2O_3$), chromium (VI) oxide ($CrO_3$), zinc oxide (ZnO), nickel (II) oxide (NiO), palladium (II) oxide (PdO), platinum (IV) oxide ($PtO_2$), ruthenium (IV) oxide ($RuO_2$), and rhodium (III) oxide ($Rh_2O_3$). In a preferred embodiment, the protective layer comprises palladium. In still another embodiment, the protective layer has a thickness not greater than approximately 10 nm.

In another aspect, the invention relates to a display, that includes a display element, and a vapor-permeable electrode adjacent the display element. In one embodiment, the display includes an electrophoretic display element that has as components a capsule, a dispersing fluid having a first optical property disposed within the capsule, and at least one electrophoretically-mobile particle disposed within the capsule. The at least one electrophoretically-mobile particle has a second optical property different from the first optical property, and the at least one electrophoretically-mobile particle can change position within the capsule under the influence of an applied electric field. The appearance of the display element can change depending on where the at least one electrophoretically-mobile particle is situated within the capsule.

In another embodiment, the vapor-permeable electrode comprises an electrode permeable to water vapor. In another embodiment, the vapor-permeable electrode comprises a reticulated electrically conductive structure. The reticulated electrically conductive structure can be a wire mesh. The wire mesh can be made of copper or bronze, as well as other metals. The reticulated electrically conductive structure can be a reticulated layer at least partially coated with an electrically conductive material, or it can be a reticulated layer at least partially impregnated with an electrically conductive material.

In another aspect the invention relates to an electrostatically addressable display, including a display element having a first surface and a second surface, a protective layer disposed adjacent the first surface of the display element, the protective layer capable of transmitting charge, and an electrode disposed adjacent the second surface of the display element.

In one embodiment, the protective layer is flexible. In one detailed embodiment, the protective layer comprises an anisotropic material. For example, the protective layer can comprise a sheet of plastic and a plurality of conductive elements vertically embedded in the sheet. The conductive elements can comprise a plurality of rods. The conductive elements can be substantially invisible. Alternatively, the protective layer can comprise a semiconductor. For example, the protective layer can comprise a polymeric semiconductor including a plurality of photoconductors. The protective layer can is comprise a layer of polymeric material, such as Mylar.

In another embodiment, the display includes an electrophoretic display element that has as components a capsule, a dispersing fluid having a first optical property disposed within the capsule, and at least one electrophoretically-mobile particle disposed within the capsule. The at least one electrophoretically-mobile particle has a second optical property different from the first optical property, and the at least one electrophoretically-mobile particle can change position within the capsule under the influence of an applied electric field. The movement of the at least one electrophoretically-mobile particle within the capsule changes the appearance of the display element.

In another embodiment, the application of an electrostatic voltage of less than 1000 volts across the display creates an electrostatic voltage of at least 5 volts across the electrophoretic element. In still another embodiment the protective layer disposed adjacent the first surface of the capsule comprises a layer having a resistivity less than $10^{12}$ ohm-centimeters and the electrophoretic element comprises a material having a resistivity greater than $10^{12}$ ohm-centimeters. In yet another embodiment, the protective layer comprises a material having a resistivity greater than a resistivity of the electrophoretic element and a thickness that is not more than 20% of the thickness of a layer of the electrophoretic elements, whereby a resistance of the protective layer is approximately 20% of a resistance of the electrophoretic element. In a further embodiment, the protective layer disposed adjacent the first surface of the display element comprises a layer of polymeric material. In still another embodiment, the protective layer disposed adjacent the first surface of the display element comprises a layer that conducts charge in a direction substantially perpendicular to the layer. In an additional embodiment, the protective layer disposed adjacent the first surface of the display element comprises a layer of an insulating material having a plurality of conductive structures extending therethrough. In yet a further embodiment, the protective layer disposed adjacent the first surface of the display element comprises a first region having a first resistivity and a second region having a second resistivity.

In a still further embodiment, the first region having a first resistivity and the second region having a second resistivity comprise a material which is doped differently within the first region and the second region. In one detailed embodiment, the first region comprises a first material and the second region comprises a second different material. In another embodiment, the less conductive of the first and the second regions is continuous and surrounds an array of isolated segments of the more conductive of the first and the second regions. In a further embodiment, the less conductive of the first and the second regions comprises vias providing access to the array of isolated segments. In an alternative embodiment, the less conductive of the first and the second materials comprises a region that is continuous and that surrounds an array of islands of the more conductive of the first and the second materials, and the less conductive of the first and the second materials comprises pinholes providing access to the array of islands. The plurality of pinholes can comprise pinholes large enough to receive a print head. The array of islands can form a visible array of pixels when actuated by an electrostatic print head. In another example, the protective layer has a first surface and a second surface, and the second surface of the protective layer comprises the array of islands in electrical communication with the first surface of the electrophoretic material layer. The array of islands can be in physical contact with the electrophoretic material. The protective layer can comprise one or more vias providing access to the array of islands. The protective layer can comprise one or more pinholes providing access to the array of islands. The pinholes form an array which correspond to the array of islands.

In another embodiment, the protective layer disposed adjacent the first surface of the display element comprises a first region having a first resistivity and a plurality of regions having a second resistivity. In yet a further embodiment, the plurality of regions having a second resistivity comprises arrays of three islands.

In yet another embodiment, the protective layer comprises a substrate having a coating of a substantially transparent radiation responsive charge emitting material disposed on a surface. The coating can be light or heat responsive. The surface having the coating can be disposed adjacent the electrophoretic material.

In yet another embodiment, the protective layer comprises an anisotropic conductor. In one detailed embodiment, the anisotropic conductor comprises a substantially linear array of colloidal metal spheres. The substantially linear array can be substantially perpendicular to a plane of the protective layer. In one example, the colloidal metal spheres are substantially closely packed to form a vertical conductive path. In another example, the colloidal metal spheres are partially closely packed to form a vertical conductive path when compressed. The colloidal metal spheres can be compressed with a stylus or a print head.

In still another embodiment, the step of providing the protective layer can comprise coating a substrate with a substantially transparent radiation responsive charge emitting material. In one example, providing the protective layer can comprise coating a substrate with a substantially transparent light responsive charge emitting material. In another example, providing the protective layer can comprise coating a substrate with a substantially transparent heat responsive charge emitting material. In yet another embodiment, the step of providing the protective layer comprises placing a layer of conductive material on a substrate and etching portions of the layer to form an array of islands.

In another aspect the invention relates to a method of addressing an electrostatically addressable display element, comprising steps (a) through (e). Step (a) involves providing an electrophoretic element. The electrophoretic element includes a capsule, a dispersing fluid having a first optical property disposed within the capsule, and at least one electrophoretically-mobile particle disposed within the capsule. The at least one electrophoretically-mobile particle has a second optical property different from the first optical property, and the at least one electrophoretically-mobile particle can change position within the capsule under the influence of an applied electric field. The movement of the at least one electrophoretically-mobile particle within the capsule changes the visual appearance of the display element. Steps (b) through (e) involve: (b) providing a protective layer disposed adjacent the capsule, the protective layer adapted to to transmit charge, (c) providing a first electrode disposed adjacent the capsule, (d) disposing adjacent the protective layer an addressing electrode, and (e) activating the addressing electrode in conjunction with the first electrode to subject the electrophoretic element to a selected one of the first applied electric field and the second applied electric field produced between the first electrode and the addressing electrode so as to address the electrophoretic element. The method of addressing a display can involve addressing with an electrostatic print head having a first electrodes In one embodiment, step (b) comprises providing a layer of an insulating material having a plurality of conductive structures disposed therethrough, and step (e) comprises activating the addressing electrode in conjunction with the first electrode by touching at least one of the conductive structures so as to apply a selected one of the first applied electric field and the second applied electric field produced between the first electrode and the conductive structure so as to address the electrophoretic element In another embodiment, step (b) comprises providing a layer of a material having a more resistive region and a less resistive region, the less resistive region comprising at least one island adjacent the electrophoretic element, the more resistive region having at least one pinhole therethrough, the at least one pinhole providing access to the at least one island of more conductive material, and step (e) comprises activating the addressing electrode in conjunction with the first electrode by emitting charge that passes through the at least one pinhole so as to apply a selected one of the first applied electric field and the second applied electric field produced between the first electrode and the at least one island so as to address the electrophoretic element.

In another embodiment the invention provides a display comprising an electrophoretic display element capable of changing its appearance in response to an electric field; and a protective layer secured to this display element, adapted to prevent mechanical damage thereto and capable of transmitting charge to the display element. Preferably, this display element is essentially laminar having opposed first and second surfaces and protective layers are secured to both the first and second surfaces.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

FIG. 5A is a diagrammatic side view of an embodiment of a rear-addressing electrode structure for a particle-based display in which multiple smaller electrodes have been placed at a voltage relative to multiple larger electrodes, causing the particles to migrate to the smaller electrodes.

FIG. 5B is a diagrammatic side view of an embodiment of a rear-addressing electrode structure for a particle-based display in which multiple larger electrodes have been placed at a voltage relative to multiple smaller electrodes, causing the particles to migrate to the larger electrodes.

FIG. 8A is a diagrammatic perspective view of an embodiment of an electrophoretic display comprising a protective layer with an addressing device that may be movably positioned adjacent the electrophoretic display according to the invention.

FIG. 8B is a diagrammatic perspective view of an embodiment of a protective layer having two regions of differing resistivity and conductivity according to the invention.

FIG. 8C is a diagrammatic side view of an embodiment of a protective layer having a first conductivity and having objects that have greater conductivity extending through the protective layer according to the invention.

FIG. 8D is a diagrammatic side view of an embodiment of a protective layer having a first conductivity and having regions that have a greater conductivity and interconnects extending through the protective layer according to the invention.

FIG. 8E is a diagrammatic side view of an embodiment of a protective layer having a first conductivity and having vias or holes extending through the protective layer according to the invention.

FIG. 8F is a diagrammatic side view of an embodiment of a protective layer having a first conductivity and having regions comprising three islands that have a greater conductivity and associated interconnects extending through the protective layer according to the invention.

FIG. 8G is a diagrammatic plan view of an embodiment of a protective layer having a first conductivity and having regions comprising three islands that have a greater conductivity and associated interconnects extending through the protective layer according to the invention.

DETAILED DESCRIPTION OF THE INVENTION

Figure 1A:
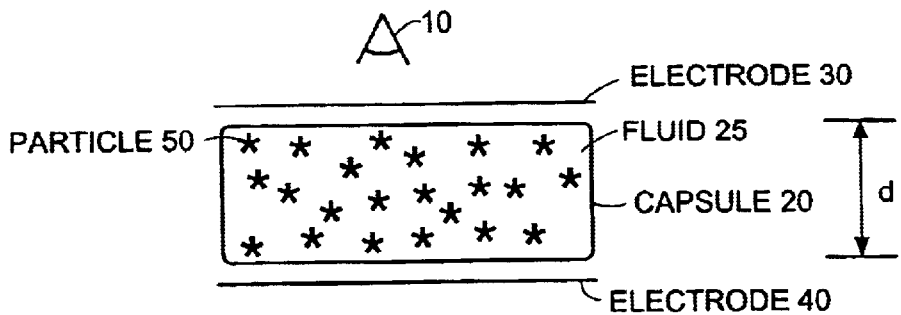
FIG. 1A is a diagrammatic side view of an embodiment of an addressing electrode structure for a particle-based display element in which no field has been applied to the display element, and the particles are dispersed throughout the element.

An object of the invention is to provide a long-lasting, highly-flexible, reflective display that can be manufactured easily, consumes little power (or none in the case of bistable displays), and can, therefore, be incorporated into a variety of applications. The invention features apparatus and methods for providing an electrophoretic display comprising an encapsulated electrophoretic display medium and protective electrodes that result in reduced degradation of the display caused by mechanical and electrochemical action, thereby lengthening the life of the electrophoretic display.

Use of the word "printing" is intended to include all forms of printing and coating, including, but without limitation: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; and other similar techniques. Thus, the resulting display can be flexible. Further, because the display media can be printed (using a variety of methods), the display itself can be made inexpensively.

In broad overview, the invention relates to encapsulated electrophoretic displays that provide a flexible, reflective display that can be manufactured easily and consume little power (or no power in the case of bistable displays in certain states), as well as materials and methods useful in their construction. Such displays, therefore, can be incorporated into a variety of applications. The display can be formed from and can include particles that move in response to an electric charge. This mode of operation is typical in the field of electrophoretics. A display in which the particles, ordered by an electric charge, take on a certain configuration can take on many forms. Once the electric field is removed, the particles can be generally stable (e.g., bistable). Additionally, providing a subsequent electric charge can alter a prior configuration of particles. Some encapsulated electrophoretic displays may include two or more different types of particles. Such displays may include, for example, displays containing a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. The particles may have a refractive index that substantially matches the refractive index of the suspending fluid.

An encapsulated electrophoretic display can be constructed so that the optical state of the display is stable for some length of time. When the display has two states that are stable in this manner, the display is bistable. If more than two states of the display are stable, then the display is multistable. For the purpose of the present invention, the term bistable indicates a display in which any optical state remains fixed once the addressing voltage is removed.

However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may include capsules dispersed in a binder. The capsules may be of any size or shape. The capsules may, for example, be spherical and may have diameters in the millimeter range or the micron range, but are preferably from about ten to about a few hundred microns. The capsules may be formed by an encapsulation technique. Particles may be encapsulated in the capsules. The particles may be one or more different types of particles. The particles may be colored, luminescent, light-absorbing or transparent, for example. The particles may include neat pigments, dyed (laked) pigments or pigment/polymer composites, for example. The display may further include a suspending fluid in which the particles are dispersed.

Generally, an encapsulated electrophoretic display includes a capsule with one or more species of particle that either absorb or scatter light and that are suspended in a fluid. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (black), while the other species of particle scatters light (white). There are other extensions (more than two species of particles, with or without a dye, etc.). The particles are commonly solid pigments, dyed particles, or pigment/polymer composites.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

The successful construction of an encapsulated electrophoretic display requires the proper interaction of all these materials and processes. Materials such as a polymeric binder (for example, for binding the capsules to a substrate), electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may act as adhesives between capsule membranes and electrode surfaces.

Materials for use in creating electrophoretic displays relate to the types of materials, including, but not limited to, particles, dyes, suspending fluids, and binders used in fabricating the displays. In one embodiment, types of particles that may be used to fabricate suspended particle displays include scattering pigments, absorbing pigments and luminescent particles. Such particles may also be transparent. Exemplary particles include titania, which may be coated in one or more layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and uv- or radiation-cured polymers. The materials used as substrates to support and as electrodes to address electrophoretic displays must also be compatible with the materials and processes that are described above.

While the examples described here are listed using encapsulated electrophoretic displays, there are other particle-based display media that also should work well, including encapsulated suspended particles and rotating ball displays. Other display media, such as liquid crystals and magnetic particles, also can be useful.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials, Further, it may contain surfactants and cross-linking agents, which could aid in coating or durability. The polymer-dispersed electrophoretic display may be of the emulsion or phase separation type.

An electronic ink is an optoelectronically active material which comprises at least two phases: an electrophoretic contrast media phase and a coating/binding phase. The electrophoretic phase comprises, in some embodiments, a single species of electrophoretic particles dispersed in a clear or dyed medium, or more than one species of electrophoretic particles having distinct physical and electrical characteristics dispersed in a clear or dyed medium. In some embodiments the electrophoretic phase is encapsulated, that is, there is a capsule wall phase between the two phases. The coating/binding phase includes, in one embodiment, a polymer matrix that surrounds the electrophoretic phase. In this embodiment, the polymer in the polymeric binder is capable of being dried, crosslinked, or otherwise cured as in traditional inks, and therefore a printing process can be used to deposit the electronic ink onto a substrate. An electronic ink is capable of being printed by several different processes, depending on the mechanical properties of the specific ink employed. For example, the fragility or viscosity of a particular ink may result in a different process selection. A very viscous ink would not be well-suited to deposition by an inkjet printing process, while a fragile ink might not be used in a knife over roll coating process.

The optical quality of an electronic ink is quite distinct from other electronic display materials. The most notable difference is that the electronic ink provides a high degree of both reflectance and contrast because it is pigment based (as are ordinary printing inks). The light scattered from the electronic ink comes from a very thin layer of pigment close to the top of the viewing surface. In this respect it resembles an ordinary, printed image. Also, electronic ink is easily viewed from a wide range of viewing angles in the same manner as a printed page, and such ink approximates a Lambertian contrast curve more closely than any other electronic display material. Since electronic ink can be printed, it can be included on the same surface with any other printed material, including traditional inks. Electronic ink can be made optically stable in all display configurations, that is, the ink can be set to a persistent optical state. Fabrication of a display by printing an electronic ink is particularly useful in low power applications because of this stability.

Electronic ink displays are novel in that they can be addressed by DC voltages and draw very little current. As such, the conductive leads and electrodes used to deliver the voltage to electronic ink displays can be of relatively high resistivity. The ability to use resistive conductors substantially widens the number and type of materials that can be used as conductors in electronic ink displays. In particular, the use of costly vacuum-sputtered ITO conductors, a standard material in liquid crystal devices, is not required. Aside from cost savings, the replacement of ITO with other materials can provide benefits in appearance, processing capabilities (printed conductors), flexibility, and durability. Additionally, the printed electrodes are in contact only with a solid binder, not with a fluid layer (like liquid crystals). This means that some conductive materials, which would otherwise dissolve or be degraded by contact with liquid crystals, can be used in an electronic ink application. These include opaque metallic inks for the rear electrode (e.g., silver and graphite inks), as well as conductive transparent inks for either substrate. These conductive coatings include semiconducting colloids, examples of which are ITO and antimony-doped tin oxide. Organic conductors (polymeric conductors and molecular organic conductors) also may be used. Polymers include, but are not limited to, polyaniline and derivatives, polythiophene and derivatives, poly3,4-ethylenedioxythiophene (PEDOT) and derivatives, polypyrrole and derivatives, and polyphenylenevinylene (PPV) and derivatives. Organic molecular conductors include, but are not limited to, derivatives of naphthalene, phthalocyanine, and pentacene. Polymer layers can be made thinner and more transparent than with traditional displays because conductivity requirements are not as stringent.

As an example, there is a class of materials called electroconductive powders which are also useful as coatable transparent conductors in electronic ink displays. One example is Zelec ECP electroconductive powders from DuPont Chemical Co. of Wilmington, Del.

Figure 1B:
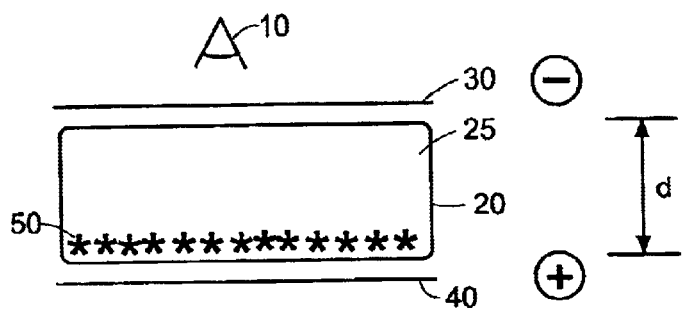
FIG. 1B is a diagrammatic side view of an embodiment of an addressing electrode structure for a particle-based display element in which the bottom electrode has been placed at a voltage relative to the top electrode causing the particles to migrate to the bottom electrode.
Figure 1C:
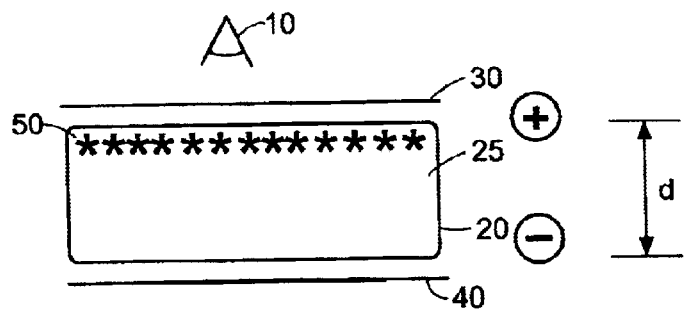
FIG. 1C is a diagrammatic side view of an embodiment of an addressing electrode structure for a particle-based display element in which the bottom electrode has been placed at a voltage relative to the top electrode causing the particles to migrate to the top electrode.

Referring now to FIGS. 1A, 1B and 1C, an addressing scheme for controlling particle-based displays is shown in which electrodes are disposed on both sides of a display, allowing the display to be addressed according to the present invention. The top electrode can be fabricated from a conductive material that is transparent, such as ITO, to permit the state of the display element to be observed through the top electrode.

FIG. 1A depicts a single capsule 20 of an encapsulated display element. In brief overview, the embodiment depicted in FIG. 1A includes a capsule 20 containing at least one particle 50 dispersed in a suspending fluid 25. The capsule 20 is addressed by a first electrode 30 and a second electrode 40. Either or both electrodes 30, 40 may be transparent conductive electrodes. In one embodiment, the first electrode 30 is situated on the top of the capsule 20 of the display element, while the second electrode 40 is situated below the capsule 20 of the display element. The first electrode 30 and the second electrode 40 may be set to voltage potentials which affect the position of the particles 50 in the capsule 20.

The particles 50 represent 0.1% to 20% of the volume enclosed by the capsule 20. In some embodiments the particles 50 represent 0.1% to 10% of the volume enclosed by capsule 20. In preferred embodiments, the particles 50 represent 0.5% to 10% of the volume enclosed by the capsule 20. In more preferred embodiments the particles 50 represent 1% to 5% of the volume defined by the capsule 20. In general, the volume percentage of the capsule 20 that the particles 50 represent should be selected so that the particles 50 provide the predominant visual effect when positioned at the top surface of the capsule 20. As described in detail below, the particles 50 may have any one of a number of optical characteristics, such as color, reflectance, retroreflectance and luminescence. The particles 50 may be either positively charged or negatively charged.

The particles 50 are dispersed in a dispersing fluid 25. The dispersing fluid 25 should have a low dielectric constant. The fluid 25 may be clear, or substantially clear, so that the fluid 25 does not inhibit viewing the particles 50 and the bottom electrode 40 from position 10. In other embodiments, the fluid 25 is dyed. In some embodiments the dispersing fluid 25 has a specific gravity matched to the density of the particles 50. These embodiments can provide a bistable display media, because the particles 50 do not tend to move in certain compositions absent an electric field applied via the electrodes 30, 40.

The electrodes 30, 40 should be sized and positioned appropriately so that together they address the entire capsule 20. There may be exactly one pair of electrodes 30, 40 per capsule 20, multiple pairs of electrodes 30, 40 per capsule 20, or a single pair of electrodes 30, 40 may span multiple capsules 20. In the embodiment shown in FIGS. 1A–1C, the capsule 20 has a flattened, rectangular shape. In these embodiments, the electrodes 30, 40 should address most, or all, of the flattened surface area adjacent the electrodes 30, 40.

Electrodes may be fabricated from any material capable of conducting electricity so that electrode 30, 40 may apply an electric field to the capsule 20. The embodiments depicted in FIGS. 1A–1C allow the electrode 40 to be fabricated from opaque materials such as solder paste, copper, copper-clad polyimide, graphite inks, silver inks and other metal-containing conductive inks. Electrode 30 may be fabricated using transparent materials such as ITO and conductive polymers such as polyaniline or polythiopenes. Electrode 40 may also be fabricated using transparent materials. Electrode 40 may be provided with contrasting optical properties. In some embodiments, the electrode 40 has an optical property complementary to optical properties of the particles 50.

In one embodiment, the capsule 20 contains positively charged black particles 50, and a dyed suspending fluid 25. The top electrode 30 is clear, and the bottom electrode 40 is opaque. When the top electrode 30 is placed at a negative voltage potential relative to bottom electrode 40, the positively-charged particles 50 migrate to the top electrode 30. The effect to a viewer of the capsule 20 located at position 10 is a capsule having a front surface covered with black particles 50, creating an effect that is largely black. Referring to FIG. 1B, when the top electrode 30 is placed at a positive voltage potential relative to the bottom electrode 40, particles 50 migrate to the bottom electrode 40 and the viewer is presented a view of the dyed suspending fluid 25 that is observed through the transparent top electrode 30, creating an effect which is largely the appearance of the dyed suspending fluid 25. In this manner the capsule 20 may be addressed to display either a visual state characteristic of the dyed fluid 25 or a black visual state.

Other two-color schemes are easily provided by varying the color of the suspending fluid 25 and the particles 50. For example, varying the color of the suspending fluid 25 allows fabrication of a two-color display having black as one of the colors. Alternatively, varying the color of the particles 50 allows a two-color system to be fabricated having the color of the dyed suspending fluid 25 as one of the colors. In certain embodiments, the particles 50 exhibit bistability, that is, they are substantially motionless in the absence of an electric field.

Another alternative embodiment can be constructed using two species of particles 50, 50' having two different colors, and two different electrophoretic mobilities, such that one of the species, for example 50, moves toward the top electrode 30 when a first potential is applied across the electrodes 30 and 40, and the other species of particles, 50', moves toward the top electrode 30 when a second potential is applied across the electrodes 30 and 40. For example, the first species of particles 50 can be black and positively charged, while the second species of particles 50' can be white and negatively charged. In such an embodiment, when the top electrode 30 is held at a more positive potential than electrode 40, the white, negative particles 50' move toward the top electrode 30 and the black, positive particles 50 move toward the bottom electrode 40, causing the capsule to have a white visual appearance characteristic of the particles 50'. When the top electrode 30 is held at a more negative potential than electrode 40, the white, negative particles 50' move toward the bottom electrode 40 and the black, positive particles 50 move toward the top electrode 30, causing the capsule to have a black visual appearance characteristic of the particles 50. In other two color embodiments, an appropriate choice of the colors of the positive and the negative particles can permit an electrophoretic element that can display two desired colors to be realized.

Figure 2A:
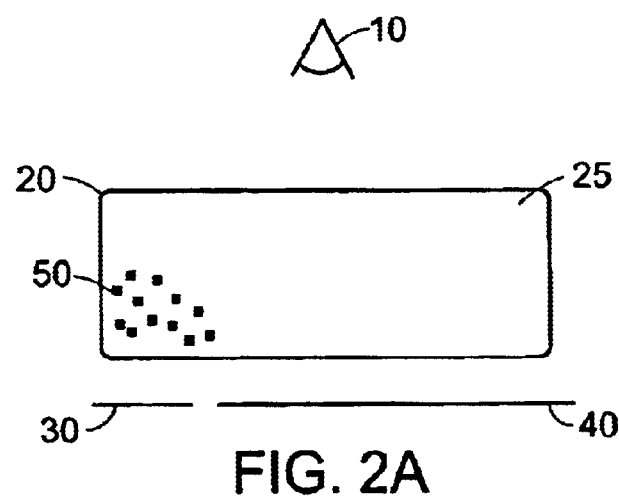
FIG. 2A is a diagrammatic side view of an embodiment of a rear-addressing electrode structure for a particle-based display in which the smaller electrode has been placed at a voltage relative to the large electrode causing the particles to migrate to the smaller electrode.
Figure 2B:
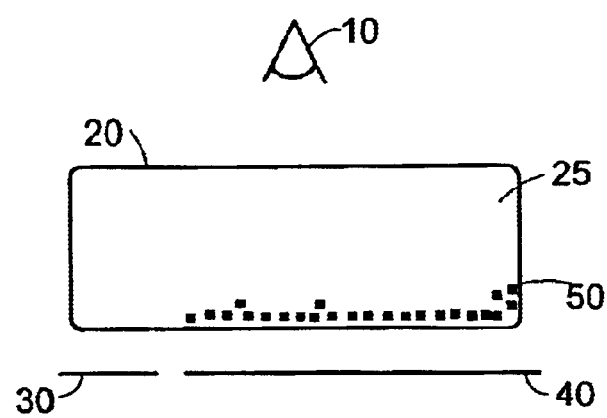
FIG. 2B is a diagrammatic side view of an embodiment of a rear-addressing electrode structure for a particle-based display in which the larger electrode has been placed at a voltage relative to the smaller electrode causing the particles to migrate to the larger electrode.

Referring now to FIGS. 2A and 2B, an addressing scheme for controlling particle-based displays is shown in which electrodes are disposed on only one side of a display, allowing the display to be rear-addressed. Utilizing only one side of the display for electrodes simplifies fabrication of displays. For example, if the electrodes are disposed on only the rear side of a display, both of the electrodes can be fabricated using opaque materials, because the electrodes do not need to be transparent.

FIG. 2A depicts a single capsule 20 of an encapsulated display media. In brief overview, the embodiment depicted in FIG. 2A includes a capsule 20 containing at least one particle 50 dispersed in a suspending fluid 25. The capsule 20 is addressed by a first electrode 30 and a second electrode 40. The first electrode 30 is smaller than the second electrode 40. The first electrode 30 and the second electrode 40 may be set to voltage potentials which affect the position of the particles 50 in the capsule 20.

The particles 50 represent 0.1% to 20% of the volume enclosed by the capsule 20. In some embodiments the particles 50 represent 0.1% to 10% of the volume enclosed by capsule 20. In preferred embodiments, the particles 50 represent 0.5% to 10% of the volume enclosed by the capsule 20. In more preferred embodiments the particles 50 represent 1% to 5% of the volume defined by the capsule 20. In general, the volume percentage of the capsule 20 that the particles 50 represent should be selected so that the particles 50 expose most of the second, larger electrode 40 when positioned over the first, smaller electrode 30. As described in detail below, the particles 50 may be colored any one of a number of colors. The particles 50 may be either positively charged or negatively charged.

The particles 50 are dispersed in a dispersing fluid 25. The dispersing fluid 25 should have a low dielectric constant. The fluid 25 may be clear, or substantially clear, so that the fluid 25 does not inhibit viewing the particles 50 and the electrodes 30, 40 from position 10. In other embodiments, the fluid 25 is dyed. In some embodiments the dispersing fluid 25 has a specific gravity matched to the density of the particles 50. These embodiments can provide a bistable display media, because the particles 50 do not tend to move in certain compositions absent an electric field applied via the electrodes 30, 40.

Figure 2C:
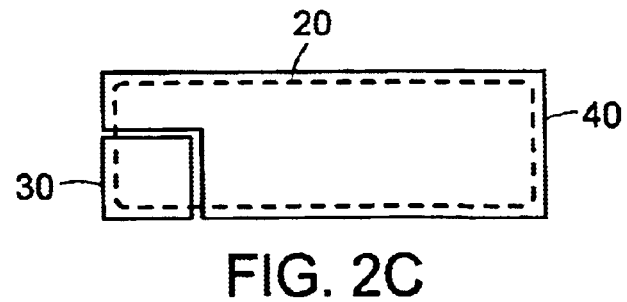
FIG. 2C is a diagrammatic top-down view of one embodiment of a rear-addressing electrode structure.

The electrodes 30, 40 should be sized and positioned appropriately so that together they address the entire capsule 20. There may be exactly one pair of electrodes 30, 40 per capsule 20, multiple pairs of electrodes 30, 40 per capsule 20, or a single pair of electrodes 30, 40 may span multiple capsules 20. In the embodiment shown in FIGS. 2A and 2B, the capsule 20 has a flattened, rectangular shape. In these embodiments, the electrodes 30, 40 should address most, or all, of the flattened surface area adjacent the electrodes 30, 40. The smaller electrode 30 is at most one-half the size of the larger electrode 40. In preferred embodiments the smaller electrode is one-quarter the size of the larger electrode 40; in more preferred embodiments the smaller electrode 30 is one-eighth the size of the larger electrode 40. In even more preferred embodiments, the smaller electrode 30 is one-sixteenth the size of the larger electrode 40. It should be noted that reference to "smaller" in connection with the electrode 30 means that the electrode 30 addresses a smaller amount of the surface area of the capsule 20, not necessarily that the electrode 30 is physically smaller than the larger electrode 40. For example, multiple capsules 20 may be positioned such that less of each capsule 20 is addressed by the "smaller" electrode 30, even though both electrodes 30, 40 are equal in size. It should also be noted that, as shown in FIG. 2C, electrode 30 may address only a small corner of a rectangular capsule 20 (shown in phantom view in FIG. 2C), requiring the larger electrode 40 to surround the smaller electrode 30 on two sides in order to properly address the capsule 20. Selection of the percentage volume of the particles 50 and the electrodes 30, 40 in this manner allow the encapsulated display media to be addressed as described below.

Electrodes may be fabricated from any material capable of conducting electricity so that electrode 30, 40 may apply an electric field to the capsule 20. As noted above, the rear-addressed embodiments depicted in FIGS. 2A and 2B allow the electrodes 30, 40 to be fabricated from opaque materials such as solder paste, copper, copper-clad polyimide, graphite inks, silver inks and other metal-containing conductive inks. Alternatively, electrodes may be fabricated using transparent materials such as ITO and conductive polymers such as polyaniline or polythiopenes. Electrodes 30, 40 may be provided with contrasting optical properties. In some embodiments, one of the electrodes has an optical property complementary to optical properties of the particles 50.

In one embodiment, the capsule 20 contains positively charged black particles 50, and a substantially clear suspending fluid 25. The first, smaller electrode 30 is colored black, and is smaller than the second electrode 40, which is colored white or is highly reflective. When the smaller, black electrode 30 is placed at a negative voltage potential relative to larger, white electrode 40, the positively-charged particles 50 migrate to the smaller, black electrode 30. The effect to a viewer of the capsule 20 located at position is a mixture of the larger, white electrode 40 and the smaller, black electrode 30, creating an effect which is largely white. Referring to FIG. 2B, when the smaller, black electrode 30 is placed at a positive voltage potential relative to the larger, white electrode 40, particles 50 migrate to the larger, white electrode 40 and the viewer is presented a mixture of the black particles 50 covering the larger, white electrode 40 and the smaller, black electrode 30, creating an effect which is largely black. In this manner the capsule 20 may be addressed to display either a white visual state or a black visual state.

Other two-color schemes are easily provided by varying the color of the smaller electrode 30 and the particles 50 or by varying the color of the larger electrode 40. For example, varying the color of the larger electrode 40 allows fabrication of a rear-addressed, two-color display having black as one of the colors. Alternatively, varying the color of the smaller electrode 30 and the particles 50 allow a rear-addressed two-color system to be fabricated having white as one of the colors. Further, it is contemplated that the particles 50 and the smaller electrode 30 can be different colors. In these embodiments, a two-color display may be fabricated having a second color that is different from the color of the smaller electrode 30 and the particles 50. For example, a rear-addressed, orange-white display may be fabricated by providing blue particles 50, a red, smaller electrode 30, and a white (or highly reflective) larger electrode 40. In general, the optical properties of the electrodes 30, 40 and the particles 50 can be independently selected to provide desired display characteristics. In some embodiments the optical properties of the dispersing fluid 25 may also be varied, e.g. the fluid 25 may be dyed.

Figure 3A:
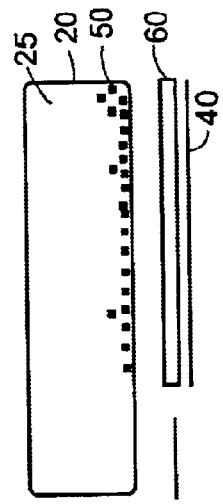
FIG. 3A is a diagrammatic side view of an embodiment of a rear-addressing electrode structure having a retroreflective layer associated with the larger electrode in which the smaller electrode has been placed at a voltage relative to the large electrode causing the particles to migrate to the smaller electrode.
Figure 3C:
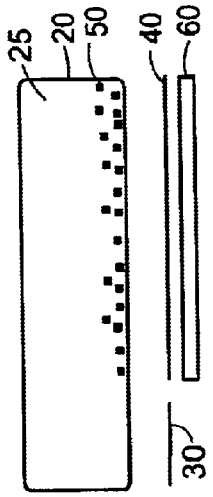
FIG. 3C is a diagrammatic side view of an embodiment of a rear-addressing electrode structure having a retroreflective layer disposed below the larger electrode in which the smaller electrode has been placed at a voltage relative to the large electrode causing the particles to migrate to the smaller electrode.
Figure 3B:
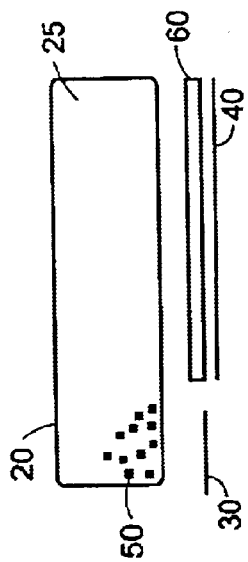
FIG. 3B is a diagrammatic side view of an embodiment of a rear-addressing electrode structure having a retroreflective layer associated with the larger electrode in which the larger electrode has been placed at a voltage relative to the smaller electrode causing the particles to migrate to the larger electrode.
Figure 3D:
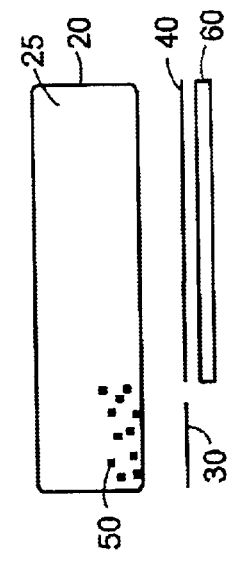
FIG. 3D is a diagrammatic side view of an embodiment of a rear-addressing electrode structure having a retroreflective layer disposed below the larger electrode in which the larger electrode has been placed at a voltage relative to the smaller electrode causing the particles to migrate to the larger electrode.

In other embodiments the larger electrode 40 may be reflective instead of white. In these embodiments, when the particles 50 are moved to the smaller electrode 30, light reflects off the reflective surface 60 associated with the larger electrode 40 and the capsule 20 appears light in color, e.g. white (see FIG. 3A). When the particles 50 are moved to the larger electrode 40, the reflecting surface 60 is obscured and the capsule 20 appears dark (see FIG. 3B) because light is absorbed by the particles 50 before reaching the reflecting surface 60. The reflecting surface 60 for the larger electrode 40 may possess retroflective properties, specular reflection properties, diffuse reflective properties or gain reflection properties. In certain embodiments, the reflective surface 60 reflects light with a Lambertian distribution. The surface 60 may be provided as a plurality of glass spheres disposed on the electrode 40, a diffractive reflecting layer such as a holographically formed reflector, a surface patteried to totally internally reflect incident light, a brightness-enhancing film, a diffuse reflecting layer, an embossed plastic or metal film, or any other known reflecting surface. The reflecting surface 60 may be provided as a separate layer laminated onto the larger electrode 40 or the reflecting surface 60 may be provided as a unitary part of the larger electrode 40. In the embodiments depicted by FIGS. 3C and 3D, the reflecting surface may be disposed below the electrodes 30, 40 vis-à-vis the viewpoint 10. In these embodiments, electrode 30 should be transparent so that light may be reflected by surface 60. In other embodiments, proper switching of the particles may be accomplished with a combination of alternating-current (AC) and direct-current (DC) electric fields and described below in connection with FIGS. 4A–4D.

In still other embodiments, the rear-addressed display previously discussed can be configured to transition between largely transmissive and largely opaque modes of operation (referred to hereafter as "shutter mode"). Referring back to FIGS. 2A and 2B, in these embodiments the capsule 20 contains at least one positively-charged particle 50 dispersed in a substantially clear dispersing fluid 25. The larger electrode 40 is transparent and the smaller electrode 30 is opaque. When the smaller, opaque electrode 30 is placed at a negative voltage potential relative to the larger, transmissive electrode 40, the particles 50 migrate to the smaller, opaque electrode 30. The effect to a viewer of the capsule 20 located at position 10 is a mixture of the larger, transparent electrode 40 and the smaller, opaque electrode 30, creating an effect which is largely transparent. Referring to FIG. 2B, when the smaller, opaque electrode 30 is placed at a positive voltage potential relative to the larger, transparent electrode 40, particles 50 migrate to the second electrode 40 and the viewer is presented a mixture of the opaque particles 50 covering the larger, transparent electrode 40 and the smaller, opaque electrode 30, creating an effect which is largely opaque. In this manner, a display formed using the capsules depicted in FIGS. 2A and 2B may be switched between transmissive and opaque modes. Such a display can be used to construct a window that can be rendered opaque. Although FIGS. 2A–3D depict a pair of electrodes associated with each capsule 20, it should be understood that each pair of electrodes may be associated with more than one capsule 20.

Figure 4A:
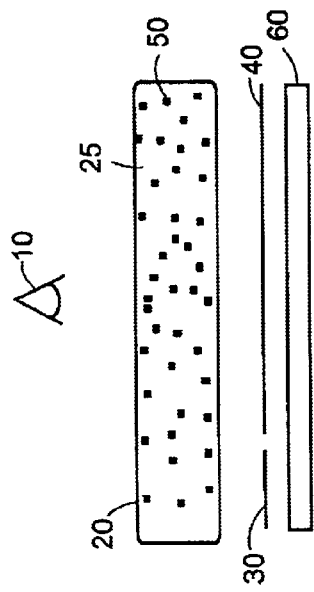
FIG. 4A is a diagrammatic side view of an embodiment of an addressing structure in which a direct-current electric field has been applied to the capsule causing the particles to migrate to the smaller electrode.

A similar technique may be used in connection with the embodiment of FIGS. 4A, 4B, 4C, and 4D. Referring to FIG. 4A, a capsule 20 contains at least one dark or black particle 50 dispersed in a substantially clear dispersing fluid 25. A smaller, opaque electrode 30 and a larger, transparent electrode 40 apply both direct-current (DC) electric fields and alternating-current (AC) fields to the capsule 20. A DC field can be applied to the capsule 20 to cause the particles 50 to migrate towards the smaller electrode 30. For example, if the particles 50 are positively charged, the smaller electrode is placed a voltage that is more negative than the larger electrode 40. Although FIGS. 4A–4D depict only one capsule per electrode pair, multiple capsules may be addressed using the same to electrode pair.

The smaller electrode 30 is at most one-half the size of the larger electrode 40. In preferred embodiments the smaller electrode is one-quarter the size of the larger electrode 40; in more preferred embodiments the smaller electrode 30 is one-eighth the size of the larger electrode 40. In even more preferred embodiments, the smaller electrode 30 is one-sixteenth the size of the larger electrode 40.

Causing the particles 50 to migrate to the smaller electrode 30, as depicted in FIG. 4A, allows incident light to pass through the larger, transparent electrode 40 and be reflected by a reflecting surface 60. In shutter mode, the reflecting surface 60 is replaced by a translucent layer, a transparent layer, or a layer is not provided at all, and incident light is allowed to pass through the capsule 20, i.e. the capsule 20 is transmissive.

Figure 4B:
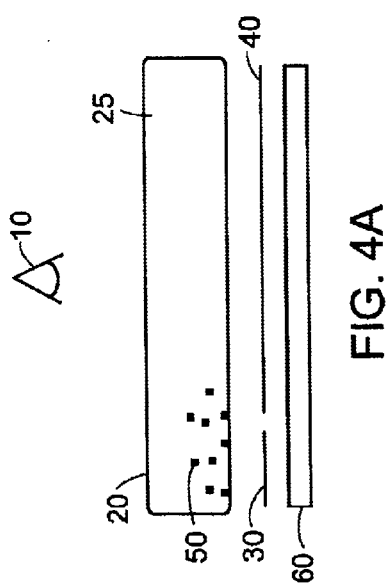
FIG. 4B is a diagrammatic side view of an embodiment of an addressing structure in which an alternating-current electric field has been applied to the capsule causing the particles to disperse into the capsule.

Referring now to FIG. 4B, the particles 50 are dispersed into the capsule 20 by applying an AC field to the capsule 20 via the electrodes 30, 40. The particles 50, dispersed into the capsule 20 by the AC field, block incident light from passing through the capsule 20, causing it to appear dark at the viewpoint 10. The embodiment depicted in FIGS. 4A–4B may be used in shutter mode by not providing the reflecting surface 60 and instead providing a translucent layer, a transparent layer, or no layer at all. In shutter mode, application of an AC electric field causes the capsule 20 to appear opaque. The transparency of a shutter mode display formed by the apparatus depicted in FIGS. 4A–4D may be controlled by the number of capsules addressed using DC fields and AC fields. For example, a display in which every other capsule 20 is addressed using an AC field would appear fifty percent transmissive.

Figure 4C:
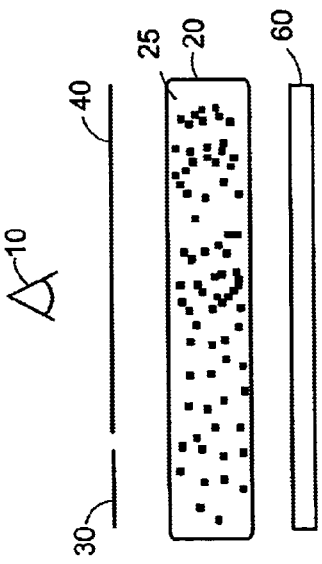
FIG. 4C is a diagrammatic side view of an embodiment of an addressing structure having transparent electrodes, in which a direct-current electric field has been applied to the capsule causing the particles to migrate to the smaller electrode.
Figure 4D:
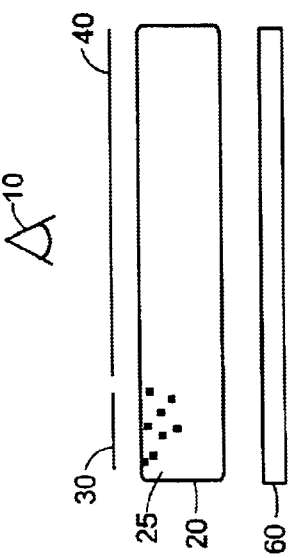
FIG. 4D is a diagrammatic side view of an embodiment of an addressing structure having transparent electrodes, in which an alternating-current electric field has been applied to the capsule causing the particles to disperse into the capsule.

FIGS. 4C and 4D depict an embodiment of the electrode structure described above in which electrodes 30, 40 are on "top" of the capsule 20, that is, the electrodes 30, 40 are between the viewpoint 10 and the capsule 20. In these embodiments, both electrodes 30, 40 should be transparent. Transparent polymers can be fabricated using conductive polymers, such as polyaniline, polythiophenes, or ITO. These materials may be made soluble so that electrodes can be fabricated using coating techniques such as spin coating, spray coating, meniscus coating, printing techniques, forward and reverse roll coating and the like. In these embodiments, light passes through the electrodes 30, 40 and is either absorbed by the particles 50, reflected by retroreflecting layer 60 (when provided), or transmitted throughout the capsule 20 (when retroreflecting layer 60 is not provided).

The addressing structure depicted in FIGS. 4A–4D may be used with electrophoretic display media and encapsulated electrophoretic display media FIGS. 4A–4D depict embodiments in which electrode 30, 40 are statically attached to the display media. In certain embodiments, the particles 50 exhibit bistability, that is, they are substantially motionless in the absence of a electric field. In these embodiments, the electrodes 30, 40 may be provided as part of a "stylus" or other device which is scanned over the material to address each capsule or cluster of capsules. This mode of addressing particle-based displays will be described in more detail below in connection with FIGS. 8A–8G.

Referring now to FIGS. 5A and 5B, a capsule 20 of a electronically addressable media is illustrated in which the technique illustrated above is used with multiple rear-addressing electrodes. The capsule 20 contains at least one particle 50 dispersed in a clear suspending fluid 25. The capsule 20 is addressed by multiple smaller electrodes 30 and multiple larger electrodes 40. In these embodiments, the smaller electrodes 30 should be selected to collectively be at most one-half the size of the larger electrodes 40. In further embodiments, the smaller electrodes 30 are collectively one-fourth the size of the larger electrodes 40. In further embodiments the smaller electrodes 30 are collectively one-eighth the size of the larger electrodes 40. In preferred embodiments, the smaller electrodes 30 are collectively one-sixteenth the size of the larger electrodes. Each electrode 30 may be provided as separate electrodes that are controlled in parallel to control the display. For example, each separate electrode may be substantially simultaneously set to the same voltage as all other electrodes of that size. Alternatively, the electrodes 30, 40 may be interdigitated to provide the embodiment shown in FIGS. 5A and 5B.

Operation of the rear-addressing electrode structure depicted in FIGS. 5A and 5B is similar to that described above. For example, the capsule 20 may contain positively charged, black particles 50 dispersed in a substantially clear suspending fluid 25. The smaller electrodes 30 are colored black and the larger electrodes 40 are colored white or are highly reflective. Referring to FIG. 5A, the smaller electrodes 30 are placed at a negative potential relative to the larger electrodes 40, causing particles 50 migrate within the capsule to the smaller electrodes 30 and the capsule 20 appears to the viewpoint 10 as a mix of the larger, white electrodes 40 and the smaller, black electrodes 30, creating an effect which is largely white. Referring to FIG. 5B, when the smaller electrodes 30 are placed at a positive potential relative to the larger electrodes 40, particles 50 migrate to the larger electrodes 40 causing the capsule 20 to display a mix of the larger, white electrodes 40 occluded by the black particles 50 and the smaller, black electrodes 30, creating an effect which is largely black. The techniques described above with respect to the embodiments depicted in FIGS. 2A and 2B for producing two-color displays work with equal effectiveness in connection with these embodiments.

Figure 6B:
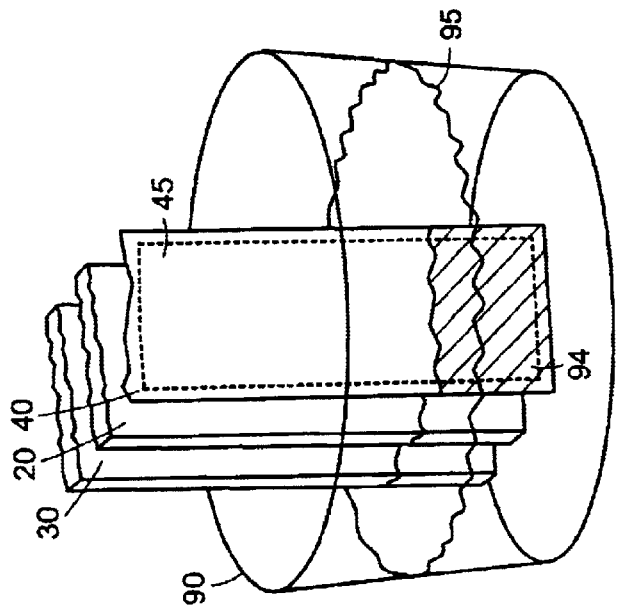
FIG. 6B is a diagrammatic exploded perspective view of an embodiment of an electrophoretic display with protective electrodes that is immersed in a fluid for the purposes of testing the degradation of the improved display according to the invention.
Figure 6C:
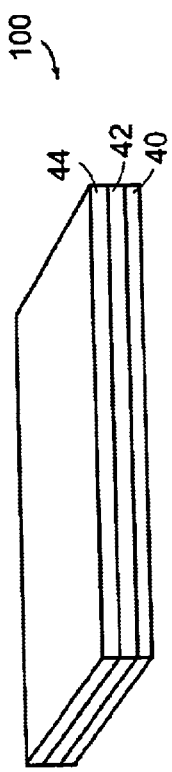
FIG. 6C is a diagrammatic side view of an embodiment of a protective electrode according to the invention.
Figure 6A:
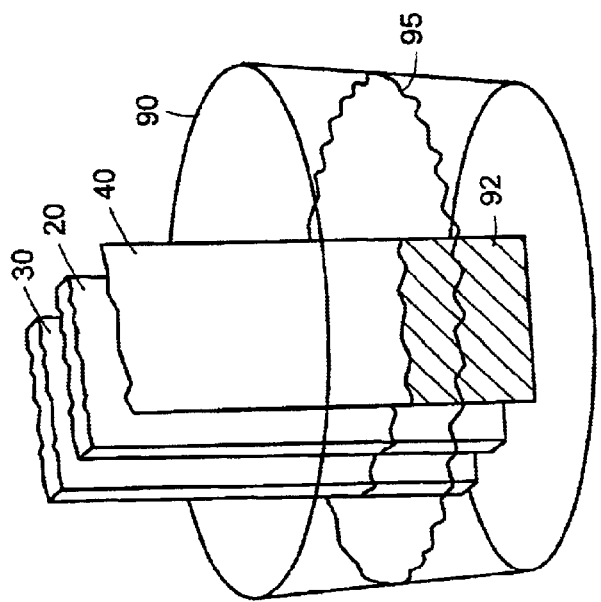
FIG. 6A is a diagrammatic exploded perspective view of an electrophoretic display without protective electrodes that is immersed in a fluid for the purposes of testing the degradation of the display.

FIG. 6A is a diagrammatic exploded perspective view of an electrophoretic display without protective electrodes that is immersed in a fluid for the purposes of testing the degradation of the display. In this testing, a display having the general characteristics of the display depicted in FIGS. 1A–1C is situated with one end immersed in a fluid 95, such as water that may contain dissolved ionic materials, contained in a vessel 90 that may be made of glass. The temperature is room temperature, and the pressure is ordinary atmospheric pressure. The display is depicted in exploded form for clarity, with the electrode 40 nearest the viewer, the capsule 20 adjacent the electrode 40, and the electrode 30 adjacent the capsule 20. The contents of the capsule 20, namely at least one particle 50 dispersed in a suspending fluid 25, have not been depicted but should be understood to be present. For the purpose of the test, the electrode 40 is a transparent conductive electrode, for example an ITO layer, that may be supported on a substrate not shown. The electrode 40 is exposed on at least one surface to the fluid 95, and the electrode 30 is also in electrical contact with the fluid. When an electrical potential is applied, from a voltage source not shown, between electrode 30 and electrode 40, it has been observed that electrode 40 may suffer degradation by an electrochemical process when biased as the cathode at a potential of 25 volts for 90 seconds. The degradation is shown as the region 92. The degradation may be due to the reduction of the mixed metal oxide to the metallic state. The degradation of the electrode 40 is observed visually as the darkening, the reduction in the transparency or the reduction of transmittance of the electrode 40. Such degradations can result in the change of appearance of an electrophoretic device, and, if the degradation is severe enough, can render the device useless. The test is intended to simulate the exposure of an electrode 40 to conditions that might cause electrochemical degradation, such as exposure to high humidity or exposure to sea air, and to observe the results.

Having observed the detrimental effects of the test depicted in FIG. 6A, attempts to prevent the problems so observed were made. FIG. 6B is a diagrammatic exploded perspective view of an embodiment of an electraphoretic display with protective electrodes that is immersed in a fluid for the purposes of testing the degradation of the improved display according to the invention. The electrode 40 is again a transparent conductive electrode such as an ITO layer, that may be supported on a substrate not shown. In this embodiment, an overcoating with a protective layer 45 has been applied, the protective layer 45 being comprised of at least one chemical composition selected from the group consisting of the metals nickel, palladium, platinum, ruthenium, rhodium, silver, aluminum, gold, titanium, chromium and zinc, and the oxides silver oxide (AgO), aluminum oxide ($Al_2O_3$), gold (III) oxide ($Au_2O_3$), titanium (II) oxide (TiO), titanium (IV) oxide ($TiO_2$), chromium (III) oxide ($Cr_2O_3$), chromium (VI) oxide ($CrO_3$), zinc oxide (ZnO), nickel (II) oxide (NiO), palladium (II) oxide (PdO), platinum (IV) oxide ($PtO_2$), ruthenium (IV) oxide ($RuO_2$), and rhodium (III) oxide ($Rh_2O_3$). In particular, a protective layer 45 comprising palladium is preferred. The protective layer 45 may be quite thin, for example not more than 10 nanometers (nm). Such layers may be applied by such diverse processes as evaporation, sputtering, deposition of a metal followed by oxidation, plating, electroplating, electroless deposition, or precipitation of an oxide from solution.

As depicted in FIG. 6B, when the electrode 40 overcoated with the protective layer 45 was immersed in a fluid 95 (water) contained in vessel 90 and subjected to the same cathodic potential of 25 volts for 90 seconds, the region 94 was observed to have suffered very much reduced degradation as compared to that observed for the region 92 of the unprotected electrode 40 of FIG. 6A. The region 94 did not suffer any appreciable darkening or loss of transparency. Tests using immersion in a fluid 95 such as water are intended to and do represent accelerated tests under aggressive conditions. For example, that portion of the electrode 40 that was not immersed in water, but was also subjected to the cathodic potential of 25 volts for 90 seconds, was not appreciably degraded. Under more mild conditions (e.g., not subjected to immersion in water), an electrode 40 protected with an overcoated protective layer 45 as described above would be expected to perform for an extended period of time at a level more satisfactory than a corresponding unprotected electrode 40.

While a single protective layer 45 may be helpful, a protective structure comprising a plurality of layers might also be useful. FIG. 6C is a diagrammatic side view of an embodiment of a protective electrode 100 having multiple layers according to the invention. In FIG. 6C, an electrode 40 is overcoated with two layers 42 and 44. The layers 42 and 44 can each comprise one or more materials selected from the group consisting of the metals and metal oxides enumerated above. It is well known in the optical arts that single layers may serve as antireflection coatings for lenses. It is also known that improved antireflection coatings are often produced from a plurality of layers having appropriate respective thickness and optical characteristics. In some cases, such coatings are applied to provide mechanical protection for a lens as well as to enhance the optical characteristics of the lens. Here, the transparent conductive electrode 40 may be protected against both electrochemical damage and mechanical damage such as scratching by a suitable combination of a plurality of overcoated layers, such as 42 and 44. The optical characteristics of the transparent conductive electrode 40 may also be adjusted or modified by a suitable combination of a plurality of overcoated layers, such as 42 and 44.

Another problem that has been observed relates to the effects of water vapor on the performance of electrophoretic devices. During the fabrication and testing of many devices, it has been noted that, after exposure to high temperature and high humidity (60° C. and 95% relative humidity), a significant amount of residence time (for example 6 to 12 hours) at 60° C. and low humidity was required before the device was able to switch normally. In addition, it has been noted that deterioration of the device occurs when it is exposed to these harshly humid conditions.

Figure 7:
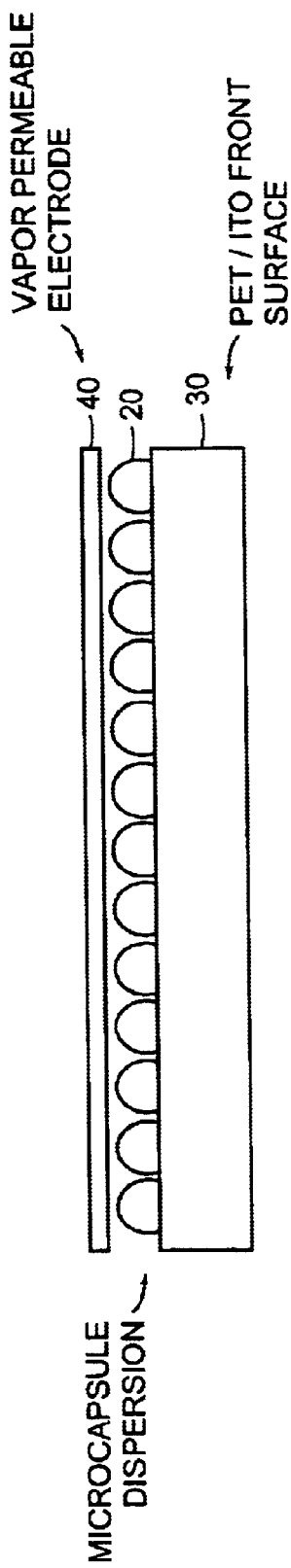
FIG. 7 is a diagrammatic side view of an embodiment of an electrophoretic display having a vapor-permeable electrode according to the invention.

FIG. 7 is a diagrammatic side view of an embodiment of an electrophoretic display having a vapor-permeable electrode according to the invention. In FIG. 7, there is a front electrode 30 that can be an ITO layer deposited on a substrate such as polyester (PET). Adjacent the electrode 30 is a layer of electrophoretic display elements comprising capsules 20, each capsule 20 containing at least one particle 50 (not shown) dispersed in a suspending fluid 25 (not shown). A vapor permeable electrode 40 is provided adjacent the layer of electrophoretic display element capsules 20. The vapor permeable electrode 40 is a reticulated electrically conductive structure. In one embodiment, the vapor permeable electrode 40 is a wire mesh. In alternative embodiments, the vapor permeable electrode 40 is a reticulated structure coated with an electrically conductive material, such as a plastic mesh coated with metal, or the vapor permeable electrode 40 is a reticulated structure impregnated with an electrically conductive material, such as a paper structure impregnated with a metal. The vapor permeable electrode 40 has been observed to permit the passage of vapor such as water vapor between the capsules 20 and the ambient air so that the concentration of water at and within the capsules 20 does not build up or diminish.

Samples of many non-laminated dispersions stored under identical (60° C. and 95% relative humidity) conditions showed no deterioration, and recovered sufficiently to switch after less than an hour at room temperature and humidity, without exposure to a dry 60° C. environment. It was decided to fabricate a laminated device incorporating the phenomenon of high permeability to water vapor. Tests were conducted using electrode structures made of copper and bronze screens and using conductive paper (e.g., silicone-treated paper, such as IPS phase-separation paper, coated with a thin metal layer), or a dispersion of a conductive metal or metal oxide in a polymeric film such as CD100. A standard resin binder was used for microcapsule 20 dispersion, and a 'top-coat' of the same resin was used for shielding the electrode from intimate contact with the microcapsules 20.

In comparison to a standard device fabricated from a microcapsule dispersion laminated between two polyester (PET) substrates of 4 ml thickness, the device with one highly permeable electrode exhibits a much quicker recovery from humidity exposure, and qualitatively seems to suffer from substantially less degradation in a similar time.

The backplane electrodes may also be fabricated from cellulose hydrophilic paper treated with crosslinked resin, or with cellophane. Both of these materials are coated with a conductive material, such as CD100, polypyrrole or similarly functioning material. Typical construction is shown in FIG. 7.

An electronic display device of the invention includes an electronic display media, a first electrode adjacent said media, and a second electrode adjacent said media. The second electrode is made of a material having a high permeability to water vapor. In one embodiment of the invention, the second electrode is silicone-treated paper. In another embodiment of the invention, the second electrode is a metal screen, and is preferably a copper screen or a bronze screen. In another embodiment, the second electrode includes a thin layer of a conductive metal or metal oxide dispersed in a polymeric binder, such as CD100, for example, disposed on the paper. In another embodiment, the second electrode also includes a thin layer of polypyrrole.

A method of fabricating an electronic display device according to the invention includes the steps of (a) providing a first electrode, (b) disposing a display media adjacent the first electrode, and (c) disposing a second electrode adjacent the display media The second electrode is made of a material having a high permeability to water vapor. In an embodiment of the invention, step (a) consists of providing a first electrode having high permeability to water vapor. In one embodiment, the second electrode is a metal screen, and is preferably a copper screen or a bronze screen. In another embodiment, the second electrode is a silicone-treated paper. The paper is preferably treated with a conductive metal or metal oxide dispersed in a polymeric binder, such as CD100, for example.

It is known in the art that electrophoretic display media may be actuated by an electrophoretic print head, including a charged or grounded stylus or other pointing device. The use of a movably positionable print head offers certain advantages, but also presents certain problems that are associated with mechanical interaction of the print head and the display that it addresses.

A problem in this approach is that the electrophoretic media of the display, if exposed to possible contact with the movably positionable print head, may rub off or be damaged. While an intervening coating or plastic layer may be introduced, the intervening layer can be problematic. If the layer is highly resistive, it acts as a dielectric and reduces the amount of electronic field experienced by the electrophoretic media. If the layer is conductive, a charge introduced on the surface by the print head may spread in the X and Y dimensions to neighboring regions and interfere with a sharp image being created.

In one approach, conductive islands, such as square pixels, are arrayed on the top surface of the intervening layer. When the print head touches each conductive island, a charge is transferred that persists for some time. This permits the electrophoretic display media to experience the weak field effect for a longer period of time.

The invention consists of using an intervening layer that nevertheless permits the charge to be translated to the electrophoretic media in a manner allowing for increased image sharpness compared to existing approaches.

Figure 8A:
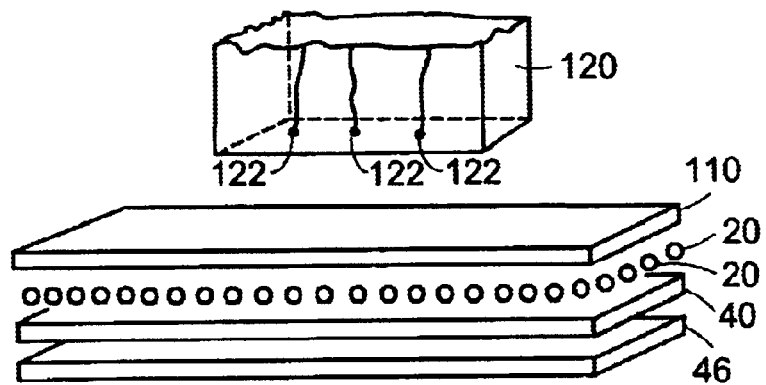
FIGS. 8A–8G, which are described individually below, are diagrammatic views of various embodiments of protective layers adapted for use with addressing devices that may be movably positioned adjacent the electrophoretic display according to the invention.

FIGS. 8A–8G, which are described individually below, are diagrammatic views of various embodiments of protective layers adapted for use with addressing devices that may be movably positioned adjacent the electrophoretic display according to the invention. FIG. 8A is a diagrammatic perspective view of an embodiment of an electrophoretic display comprising a protective layer 110 with an addressing device 120 such as a print head that may be movably positioned adjacent the electrophoretic display according to the invention. The addressing device 120 can have one or more electrodes 122 that can be positioned so as to address at least one electrophoretic display element. The addressing device 120 can operate electrostatically, can operate electrodynamically, can operate ionographically, or can operate optically, as will be described below. The display comprises the protective layer 110 adjacent at least one capsule 20. In FIG. 8A, a layer of such capsules 20 is depicted. Each capsule 20 contains at least one particle 50 (not shown) dispersed in a suspending fluid 25 (not shown). Adjacent the layer of capsules 20 is an electrode 40, and adjacent the electrode 40 is disposed a substrate 46. When the one or more electrodes 122 are correctly positioned, an electric field resulting from a signal applied between electrodes 40 and 122 can be applied to one or more capsules 20 to address the capsules 20, and to cause the capsules 20 to alter their visual state. With this general description of the method of operation of this type of addressable display in mind, one can consider the various embodiments of the protective layer 10 that may be used in the invention.

Figure 8B:
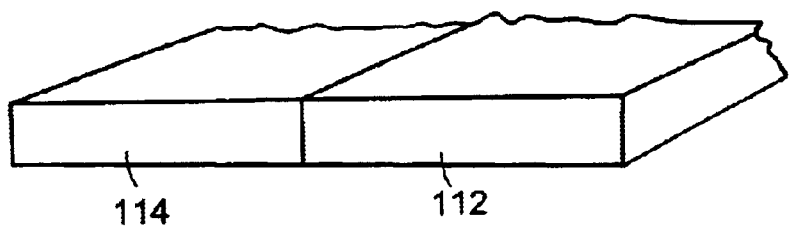

FIG. 8B is a diagrammatic perspective view of an embodiment of a protective layer having two regions 112 and 114 of differing resistivity and conductivity according to the invention. In one aspect, the protective layer is composed of a material exhibiting anisotropic properties. Such a material could be a sheet of plastic in which conductive elements have been embedded in a vertical orientation during construction. The elements could be relatively large, such as in a Z-strip construction, or fairly small as with tiny rods of a conductive substance. Such elements may be opaque if they are visually presented in an end orientation that is not very noticeable to the user, however preferably such materials are not visible to the eye.

Figure 8C:
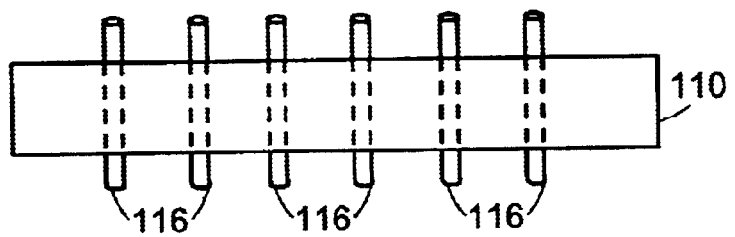

FIG. 8C is a diagrammatic side view of an embodiment of a protective layer 110 having a first conductivity and having conductive objects 116 that have greater conductivity extending through the protective layer 110 according to the invention. The electrostatic addressing head 120 can contact one or more of the conductive objects 116, which can be conductive pins or wires, so as to apply an electric field across one or more capsules 20 situated between a conductive pin 116 and the electrode 40.

Figure 8D:
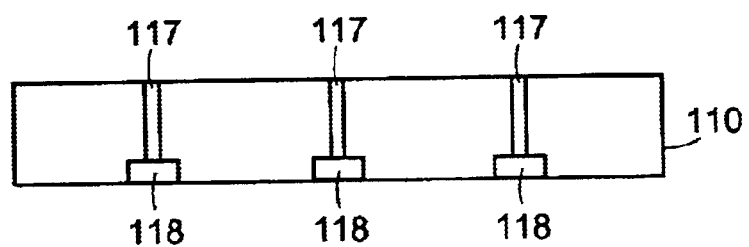

FIG. 8D is a diagrammatic side view of an embodiment of a protective layer 110 having a first conductivity and having regions 118 that have a greater conductivity and interconnects 117 extending through the protective layer according to the invention. In another aspect, the protective layer 110 is a single relatively non-conducting layer of polymeric material such as Mylar, but conductive islands 118 are printed on one surface and arranged so that the islands are touching (or in electrical communication with) the electrophoretic capsules 20.

Figure 8E:
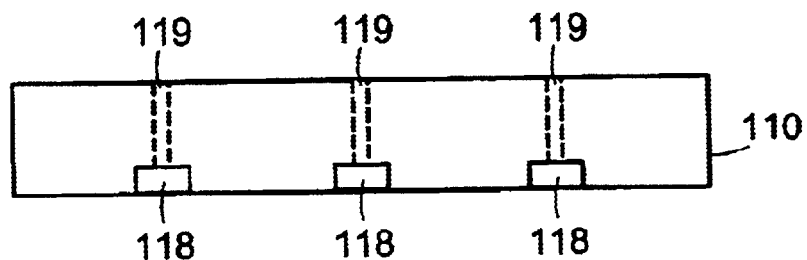

FIG. 8E is a diagrammatic side view of an embodiment of a protective layer having a first conductivity and having vias 119 or holes extending through the protective layer 110 according to the invention. In the above system, one or more through-holes 119 or vias may be introduced, so that the charge from the print head 120 can travel easily through the intervening layer 110 and communicate with the conductive island 118. An example of such construction would include perforating the intervening protective layer 110 with many pinholes 119, and then printing the conductive islands 118 using a clear conductor. In one approach the clear conductor enters the pinholes 119, by gravity or pressure, and sets, forming a local via 119. In another approach, the vias 119 are filled by another step with a different conductive material, and yet again a conductive via 119 is formed in all or most holes that may communicate with the conductive islands 118.

In yet another approach the pinholes are sufficiently wide that a passing print head 120 may in fact enter the holes 119 and touch the conductive islands 118. In one example, the pinholes are arrayed in a pattern, such as a grid, and the electrostatic print head 120 has protrusions that match the pattern and enter the pinholes 119 to transfer charge to the conductive islands 118. In another example, the print head 120 consists of many conductive needles 122 on springs; as the needles 122 pass over a hole 119 they enter and touch the conductive island 118. In another example, the print head 120 is itself highly elastomeric and temporarily extends to enter the holes 119 when pushed against the intervening layer 110, transferring charge to the conductive islands 118. Similarly the electrophoretic display media and conductive island material if sufficiently elastomeric may be pushed through to touch the print head 120.

In another approach, ions are beamed by an ionographic print head 120, possibly striking the intervening protective layer 110 without visible effect. When the ion beam aligns with a pinhole 119 it successfully transfers charge to the conductive island 118. Ions may be generated for example by a suitable ionographic print head 120 as is known in the art.

It should be clear that where the term pinholes 119 is used above, a hole of any dimension suitable for the purpose may be employed.

In another approach, a substantially clear intervening protective layer 110 is coated with a substantially clear material that emits charge when struck by a light source of sufficient intensity or at a particular wavelength. This side is placed in contact with the electrophoretic display media. A light-emitting device (substituted for the print head 120) is used to image the media. Similarly, the intervening protective layer 110 may be coated with a material that emits charge when exposed to a heat source and a suitable heat source used to image the media. In such cases, islands of the excitable material may also be suitably used.

Figure 8F:
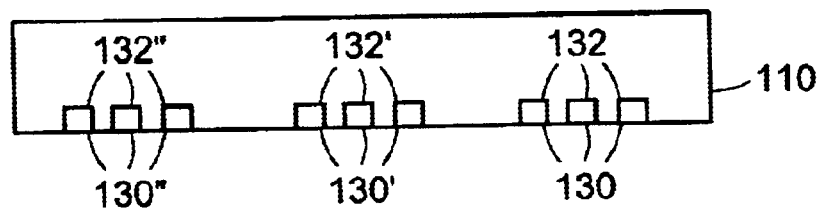

FIG. 8F is a diagrammatic side view of an embodiment of a protective layer 110 having a first conductivity and having regions comprising three islands 130 that have a greater conductivity and associated interconnects 132 extending through the protective layer 110 according to the invention. The more conductive material may be arrayed in islands, surrounded by the less conductive material. An electrostatic print head 120 will therefore primarily activate the ink beneath the discrete islands 130. In this manner, the protective layer 10 may be organized into an array of regions that will form a visible array of pixels when actuated by an electrostatic print head 120. Alternately, the same intervening material may be used across the media, but this material is doped by a conductivity enhancing agent to create conductive islands.

Figure 8G:
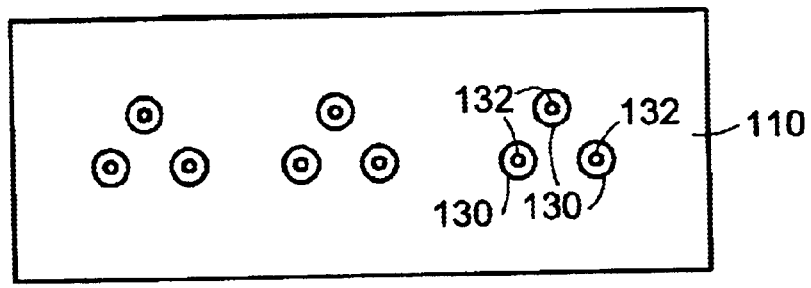

FIG. 8G is a diagrammatic plan view of an embodiment of a protective layer 110 having a first conductivity and having regions comprising three islands 130 that have a greater conductivity and associated interconnects 132 extending through the protective layer according to the invention. The method of operation is the same as that recited above in conjunction with FIG. 8F.

Figure 9:
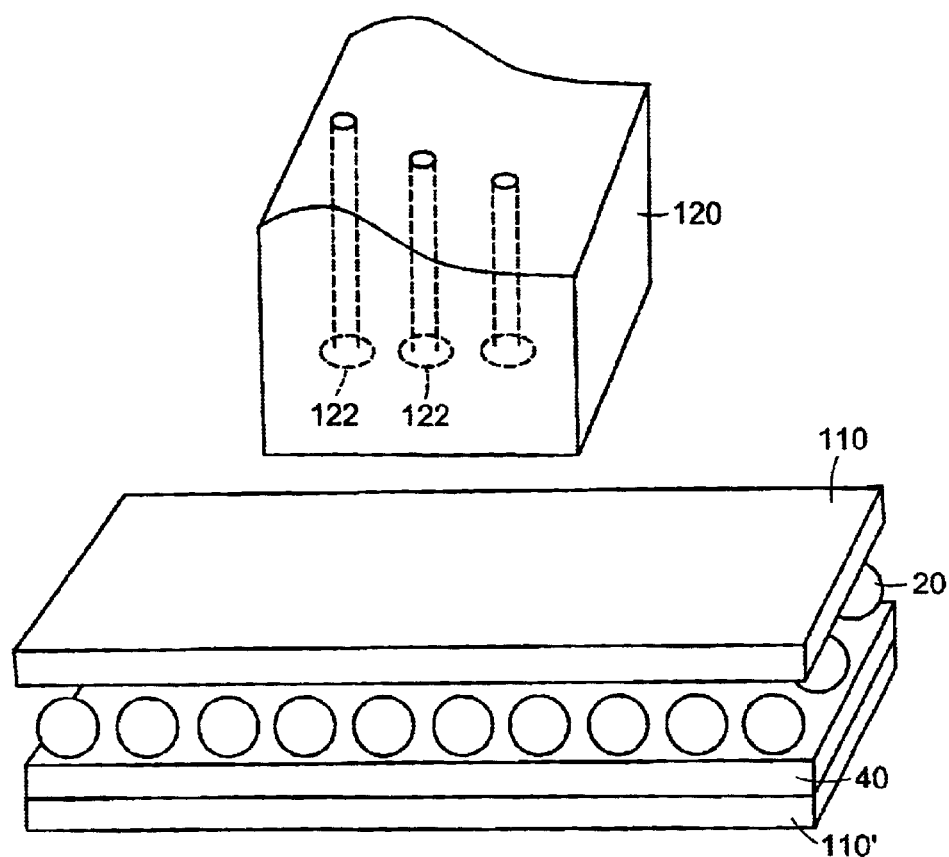
FIG. 9 shows a view, similar to that of FIG. 8A, of an embodiment of the invention having protective layers on both sides and intended for use with a printer

FIG. 9 shows a view similar to that of FIG. 8A of a modified display of the invention in the form of a electrically re-writable sheet resembling a sheet of paper and capable of being written and re-written by a "printer" similar to a conventional xerographic printer. In the display of FIG. 9, the substrate 46 present in the display of FIG. 8A is replaced by a protective layer 110', similar to the protective layer 110, and which may thus have any of the forms already described above with reference to FIGS. 8B to 8G. The protective layer 110' allows transmission of charge from a permanent electrode mounted on the printer to the electrode 40, while protecting the electrode 40 from mechanical damage such as might otherwise result from the display sliding over the permanent electrode mounted on the printer.

Figure 10:
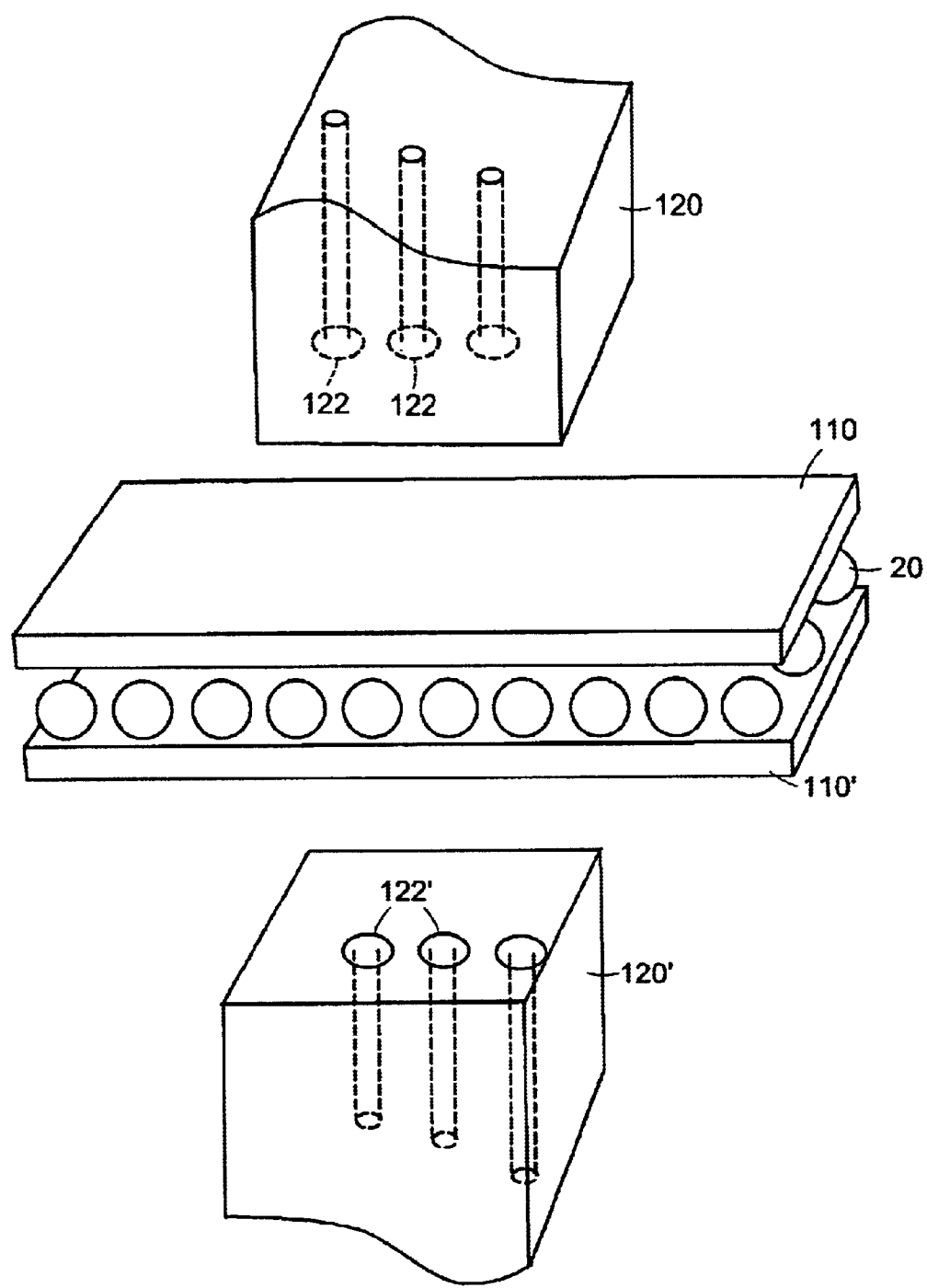
FIG. 10 shows a view, similar to that of FIGS. 8A and 9 of another embodiment of the invention intended for use with a printer.

FIG. 10 shows a view similar to that of FIGS. 8A and 9 of a further modified display of the invention intended for use as a re-writable sheet capable of being written and re-written by an appropriate printer. The display of FIG. 10 comprises a layer of capsules 20 disposed between protective layers 110 and 110' which allow the transmission of charge from print heads 120 and 120' respectively to the layer of capsules 20.

It should be clear that conductive islands may also be formed in the above cases by coating the whole sheet of protective layer 110 with a material and then etching or otherwise removing portions to form islands. Additionally, the word islands should be taken to include various regions including stripes, rectangles, triangles, and arbitrary or random shapes and patterns.

In each of the island approaches above, the islands could be arrayed in a suitable pattern such as a triad, which is then registered against an electrophoretic display media that is patterned into regions of different types of inks, such as different colors. In this manner, for example, an electrostatic print head could actuate a cyan, magenta, yellow electrophoretic display and achieve a color image.

While the examples described here are listed using encapsulated electrophoretic displays, there are other particle-based display media that should also work as well, including encapsulated suspended particles and rotating ball displays.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A display comprising:
   (a) an electrophoretic display element capable of changing its appearance in response to an electric field; and
   (b) an electrode adjacent said display element, said electrode comprising a protective layer adapted to prevent mechanical or electrochemical damage to said display element,
   wherein said electrophoretic display element comprises:
   (i) a capsule;
   (ii) a dispersing fluid having a first optical property disposed within said capsule; and
   (iii) at least one electrophoretically-mobile particle disposed within said capsule, said at least one electrophoretically-mobile particle having a second optical property different from said first optical property, said at least one electrophoretically-mobile particle adapted to change position within said capsule under the influence of an applied electric field, thereby changing the optical properties of said display element.

2. The display of claim 1 wherein said protective layer is flexible.

3. The display of claim 1 wherein said protective layer is adapted to prevent mechanical removal of said electrophoretic element from said display.

4. The display of claim 1 wherein said protective layer comprises a plurality of conductors extending therethrough.

5. A display comprising:
(a) an electrophoretic display element capable of changing its appearance in response to an electric field; and
(b) an electrode adjacent said display element, said electrode comprising a protective layer adapted to prevent mechanical or electrochemical damage to said display element,
wherein said electrode is transparent and the protective layer is disposed upon said transparent electrode, said protective layer being capable of protecting said transparent electrode from degradation under the application of an electrical potential.

6. The display of claim 5 wherein said electrode is transparent and comprises one or more oxides selected from the group consisting of indium oxide, tin oxide and indium tin oxide.

7. The display of claim 5 wherein said protective layer comprises at least one chemical composition selected from the group consisting of the metals nickel, palladium, platinum, ruthenium, rhodium, silver, aluminum, gold, titanium, chromium and zinc, and the oxides silver oxide (AgO), aluminum oxide ($Al_2O_3$), gold (III) oxide ($Au_2O_3$), titanium (II) oxide (TiO), titanium (IV) oxide ($TiO_2$), chromium (III) oxide ($Cr_2O_3$), chromium (VI) oxide ($CrO_3$), zinc oxide (ZnO), nickel (II) oxide (NiO), palladium (II) oxide (PdO), platinum (IV) oxide ($PtO_2$), ruthenium (IV) oxide ($RuO_2$), and rhodium (III) oxide ($Rh_2O_3$).

8. The display of claim 7 wherein said protective layer comprises palladium.

9. The display of claim 7 wherein said protective layer has a thickness not greater than approximately 10 nm.

10. An electrostatically addressable display, comprising:
(a) an electrophoretic display element having a first surface and a second surface, said electrophoretic display element comprising:
(i) a capsule;
(ii) a dispersing fluid having a first optical property disposed within said capsule; and
(iii) at least one electrophoretically-mobile particle disposed within said capsule, said at least one electrophoretically-mobile particle having a second optical property different from said first optical property, said at least one electrophoretically-mobile particle adapted to change position within said capsule under the influence of an applied electric field, thereby changing the optical properties of said display element; and
(b) a protective layer disposed adjacent said first surface of said display element, said protective layer capable of transmitting charge; and
(c) an electrode disposed adjacent said second surface of said display element,
wherein application of an electrostatic voltage of less than 1000 volts across the display creates an electrostatic voltage of at least 5 volts across the electrophoretic element.

11. An electrostatically addressable display, comprising:
(a) an electrophoretic display element having a first surface and a second surface, said electrophoretic display element comprising:
(i) a capsule;
(ii) a dispersing fluid having a first optical property disposed within said capsule; and
(iii) at least one electrophoretically-mobile particle disposed within said capsule, said at least one electrophoretically-mobile particle having a second optical property different from said first optical property, said at least one electrophoretically-mobile particle adapted to change position within said capsule under the influence of an applied electric field, thereby changing the optical properties of said display element; and
(b) a protective layer disposed adjacent said first surface of said display element, said protective layer capable of transmitting charge; and
(c) an electrode disposed adjacent said second surface of said display element,
wherein said protective layer disposed adjacent said first surface of said capsule comprises a layer having a resistivity less than $10^{12}$ ohm-centimeters and said electrophoretic element comprises a material having a resistivity greater than $10^{12}$ ohm-centimeters.

12. An electrostatically addressable display, comprising:
(a) an electrophoretic display element having a first surface and a second surface, said electrophoretic display element comprising:
(i) a capsule;
(ii) a dispersing fluid having a first optical property disposed within said capsule; and
(iii) at least one electrophoretically-mobile particle disposed within said capsule, said at least one electrophoretically-mobile particle having a second optical property different from said first optical property, said at least one electrophoretically-mobile particle adapted to change position within said capsule under the influence of an applied electric field, thereby changing the optical properties of said display element; and
(b) a protective layer disposed adjacent said first surface of said display element, said protective layer capable of transmitting charge; and
(c) an electrode disposed adjacent said second surface of said display element,
wherein said protective layer comprises a material having a resistivity greater than a resistivity of said electrophoretic element and a thickness that is not more than 20% of the thickness of a layer of said electrophoretic elements, whereby a resistance of said protective layer is approximately 20% of a resistance of said electrophoretic element.

13. An electrostatically addressable display, comprising:
(a) an electrophoretic display element having a first surface and a second surface;
(b) a flexible protective layer disposed adjacent said first surface of said display element, said protective layer capable of transmitting charge; and
(c) an electrode disposed adjacent said second surface of said display element,
wherein said protective layer disposed adjacent said first surface of said display element comprises a layer of polymeric material.

14. An electrostatically addressable display, comprising:
(a) an electrophoretic display element having a first surface and a second surface;
(b) a flexible protective layer disposed adjacent said first surface of said display element, said protective layer capable of transmitting charge; and (c) an electrode disposed adjacent said second surface of said display element, wherein said protective layer disposed adjacent said first surface of said display element comprises a layer of an insulating material having a plurality of conductive structures extending therethrough.

15. An electrostatically addressable display, comprising:
(a) an electrophoretic display element having a first surface and a second surface;
(b) a flexible protective layer disposed adjacent said first surface of said display element, said protective layer capable of transmitting charge; and
(c) an electrode disposed adjacent said second surface of said display element,
wherein said protective layer disposed adjacent said first surface of said display element comprises a first region having a first resistivity and a second region having a second resistivity.

16. The display of claim 15 wherein said first region having a first resistivity and said second region having a second resistivity comprise a material which is doped differently within said first region and said second region.

17. The display of claim 15 wherein the less conductive of said first and said second regions is continuous and surrounds an array of isolated segments of the more conductive of said first and said second regions.

18. The display of claim 17 wherein said less conductive of said first and said second regions comprises vias providing access to said array of isolated segments.

19. The display of claim 17 wherein said less conductive of said first and said second materials comprises a region that is continuous and that surrounds an array of islands of the more conductive of said first and said second materials, and said less conductive of said first and said second materials comprises pinholes providing access to said array of islands.

20. An electrostatically addressable display, comprising:
(a) an electrophoretic display element having a first surface and a second surface;
(b) a flexible protective layer disposed adjacent said first surface of said display element, said protective layer capable of transmitting charge; and
(c) an electrode disposed adjacent said second surface of said display element,
wherein said protective layer disposed adjacent said first surface of said display element comprises a first region having a first resistivity and a plurality of regions having a second resistivity.

21. The display of claim 20 wherein said plurality of regions having a second resistivity comprises arrays of three islands.

22. A method for addressing an electrostatically addressable display element, comprising the steps of:
(a) providing an electrophoretic element comprising:
  (i) a capsule;
  (ii) a dispersing fluid having a first optical property disposed within said capsule; and
  (iii) at least one electrophoretically-mobile particle disposed within said capsule, said at least one electrophoretically-mobile particle having a second optical property different from said first optical property, said at least one electrophoretically-mobile particle adapted to change position within said capsule under the influence of an applied electric field, thereby changing the optical properties of said display element;
(b) providing a protective layer disposed adjacent said capsule, said protective layer adapted to transmit charge;
(c) providing a first electrode disposed adjacent said capsule;
(d) disposing adjacent said protective layer an addressing electrode; and
(e) activating said addressing electrode in conjunction with said first electrode to subject said electrophoretic element to a selected one of said first applied electric field and said second applied electric field produced between said first electrode and said addressing electrode so as to address said electrophoretic element,
wherein said addressing electrode comprises part of a printer apparatus through which said display element is passed to effect said addressing.

* * * * *